US011359382B2

(12) United States Patent
Meersman et al.

(10) Patent No.: US 11,359,382 B2
(45) Date of Patent: Jun. 14, 2022

(54) ALIGNMENT MECHANISM AND ALIGNMENT METHODS FOR TILED DISPLAYS

(71) Applicant: BARCO N.V., Kortrijk (BE)

(72) Inventors: Karim Meersman, Kortemark (BE); Tom Declerck, Meulebeke (BE); Bruno Devos, Zulte (BE); Greet Adams, Deerlijk (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 16/924,575

(22) Filed: Jul. 9, 2020

(65) Prior Publication Data
US 2022/0010562 A1     Jan. 13, 2022

(51) Int. Cl.
| E04B 1/61 | (2006.01) |
| E04F 13/25 | (2006.01) |
| E04F 13/08 | (2006.01) |
| E04F 13/26 | (2006.01) |
| E04F 21/00 | (2006.01) |

(52) U.S. Cl.
CPC .......... *E04F 13/25* (2013.01); *E04F 13/0801* (2013.01); *E04F 13/0871* (2013.01); *E04F 13/26* (2013.01); *E04F 21/00* (2013.01)

(58) Field of Classification Search
None
See application file for complete search history.

(56) References Cited

U.S. PATENT DOCUMENTS

| 5,323,552 A * | 6/1994 | Fritz ................. G09F 1/10 40/605 |
| 5,761,839 A * | 6/1998 | Heikkila ............. G09F 7/08 40/730 |
| 6,054,968 A * | 4/2000 | De Matteo .......... G09F 15/0068 312/7.2 |
| 10,056,014 B2 * | 8/2018 | Meersman ............. G09F 9/3026 |
| 10,064,504 B2 * | 9/2018 | Hogrefe ................. F16M 13/02 |
| 2003/0056413 A1 * | 3/2003 | Wiemer ................ G09F 9/3026 40/730 |
| 2009/0310065 A1 * | 12/2009 | Dunn .................. H01L 25/0753 349/69 |
| 2018/0359426 A1 | 12/2018 | Adema et al. |

FOREIGN PATENT DOCUMENTS

| CN | 108922421 A | 11/2018 |
| KR | 20070085011 A | 8/2007 |
| WO | 2019034786 A1 | 2/2019 |
| WO | 2020074064 A1 | 4/2020 |

OTHER PUBLICATIONS

International Search Report and Written Opinion issued in PCT/EP2021/069236, dated Nov. 29, 2021.

* cited by examiner

*Primary Examiner* — Basil S Katcheves
(74) *Attorney, Agent, or Firm* — Hamre, Schumann, Mueller & Larson, P.C.

(57) ABSTRACT

An intermediary support structure including fasteners for fastening to a back side of a display tile and further includes a fastener or a fastening device for fastening the intermediary support structure to a support structure supporting multiple display tiles.

15 Claims, 20 Drawing Sheets

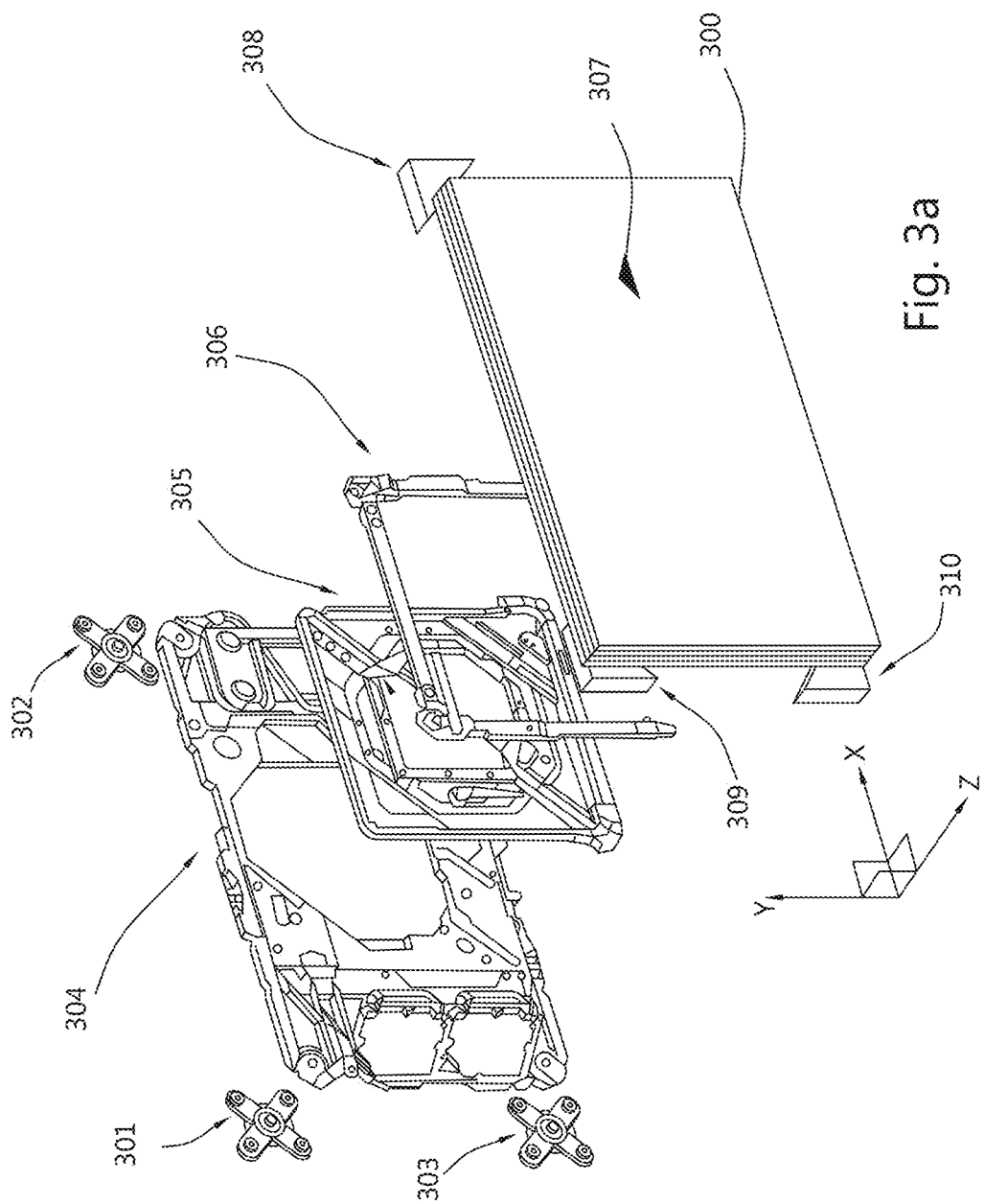

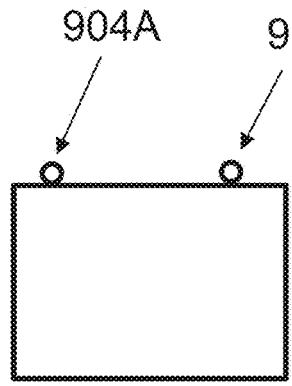
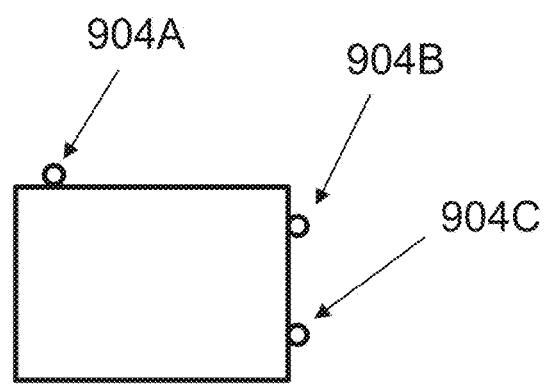
Figure 9a
Figure 9b
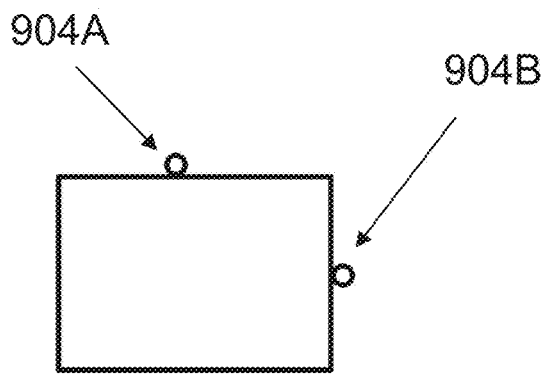
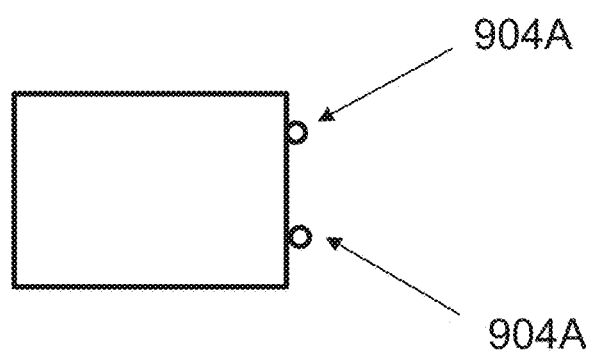
Figure 9c
Figure 9d

ALIGNMENT MECHANISM AND ALIGNMENT METHODS FOR TILED DISPLAYS

The present invention relates to methods of and devices for and systems for positioning and/or alignment of display tiles in a tiled displays, as well as an alignment mechanism to adjust the relative position of adjacent display tiles as they are assembled to form a tiled display, as well as methods of making or operating such display tiles and tiled display. The present invention relates to methods and devices for and systems for maintenance of display tiles including replacement of tiles.

BACKGROUND

Solutions to align the display tiles of a tiled display are known from the art.

U.S. Par. No. 10,056,014 "Positioning and alignment device for tiled displays" describes an alignment mechanism to adjust the relative position of adjacent display tiles as they are assembled to form a tiled display. FIGS. 1a and 1b show a top view and a section view (along line AB of FIG. 1a) of an example of alignment mechanism according to U.S. Pat. No. 10,056,014. The alignment mechanism 1 is fastened to a support structure 12 by means of a compliant fastener 2 that is force fitted into an opening 4 present in the support structure 12 and an opening 3 present in the alignment device.

Two adjacent tiles can be aligned by means of e.g. a pin (on the tile) and hole (like 9 and 10 on the alignment device) combination. The compliance of the fastener 2 allows the compensation of tolerances that affects the position of openings (like 4) in the support structure 12 while the distance between two adjacent tiles is determined by the geometry of the alignment device and in particular the position of the holes (like 9 and 10) in which positioning pins on display tiles will be fitted.

The alignment mechanism requires extensive manipulation of the tiles and for very small seams (when the distance between adjacent tiles is less than 1 mm), this can become a problem. Indeed, as the dimensions of light emitting elements decrease, they become more fragile and shocks between adjacent tiles during assembly can be enough to damage them and create visual artefacts during operation of the display (dead pixels, discoloration, etc.)

US20180359426 "Fixture for Aligning Tiled Displays" describes a fixture for adjusting the position of a display tile with respect to adjacent display tiles. The fixture includes a frame that supports a vision system. The vision system is configured to image at predefined display corner positions defined by given display dimensions. As illustrated on FIG. 2, the fixture 200 further includes an attachment mechanism configured to attach the frame of the fixture to the display surface 202 of a display tile 201 such that the vision system images positions of the tile and adjacent display corner positions. The fixture can be operated by a technician that will move the tile until its position is nominal (as determined by the vision system). Alternatively, the fixture can be supported by the support structure that supports the display tiles and one or more alignment mechanisms adjust the alignment of the display tile. US20180359426 does not describe where the one or more alignment mechanism can be positioned when the fixture is attached to the front of a display tile nor does it describe how to avoid damaging the LEDs mounted on the display tile (e.g. by scratching the coatings of the LEDs) when the fixture contacts the display tile.

WO2019/034786A1 "Adjustable support structure for display tile" describes a support structure with a built-in tile alignment system wherein collisions between adjacent display tiles are prevented. The support structure comprises several intermediary parts between the load bearing structure (not shown) and the display tile 300. Four elements (only 301, 302 and 303 are shown on FIG. 3a) correct irregularities of, for example, a wall to which the display structure will be fastened. A first intermediary part 304 has a fixed position with respect to, for example, the load bearing wall. A second intermediary mechanism 305 allows displacement of the display tile 300 in the display plane xy, a.o. to create a gap around the display tile 300 and grant access to the fastening means 306, that fasten the display 300 tile to the rest of the structure. The fastening means allow movement of the display tile in the z direction. This facilitates, for instance, access to, for example, one or more handles and/or a release mechanism positioned on the lateral sides or backside of the display tile 300, without requiring interaction with the front or display side 307 of the display tile. Shocks between adjacent display tiles are softened by the mechanism 305 (use of, for example, a gas spring, not shown on FIG. 3a) as well as by corner elements like 308, 309, 310 that can act as bumpers and avoid contact with fragile elements (such as, for example, a glass substrate of a liquid crystal panel or the coating of LEDs) on the display side 307 of the display tile 300.

As illustrated on FIG. 3b, a display tile 300 hangs to fastening means 306 (i.e. no contact with the front surface 307 is required to position the display tile). An operator assembling the tiled display does not have to carry the weight of a display tile while modifying its position in the xy plane. Not having to carry the weight of the tile during assembly means that an operator can concentrate on the precision of the positioning and avoiding shocks to the display surface. The support structure described in WO2019/034786A1 limits the risk of damages to the display side of a display tile and facilitates the assembly of display tile into a tiled display, but it requires mechanical precision for the various structures like 301, 304, 305 and 306.

If there is no access to the back of the tiled display, fastening and unfastening a display tile requires a dedicated mechanism as described in, for instance, WO2019/034786A1.

The art has no solution for using simple and reliable fastening means (like, for example, bolts) that can be accessed from the front of the tiled display, while at the same time allowing to have seams smaller than the fastening means. For instance, using bolts to fasten a display tile to a support structure without access to the back of the support structure, is not possible if the diameter of the bolt is larger than the seam between a tile already fastened to the support structure and an adjacent tile being fastened to the support structure.

What is needed in the art, are methods and apparatuses to enable the realization of high quality tiled displays with controllable seams while at the same time minimizing the precision required for, for example, machining the support structure and reducing the risk of damages to the display elements (such as, for example, light emitting diodes, surface of liquid crystal display panels, etc.).

SUMMARY OF THE INVENTION

An aspect of the present invention relates to an intermediary support structure with fastening means for fastening to a back side of a display tile further comprising a fastener or a fastening means for fastening the intermediary support structure to a support structure supporting multiple display tiles. The support structure can be a wall or a frame attached to a wall, for example.

The intermediary support structure can be characterized in that:

the fastening means for fastening to a support structure is distributed along one side of the display tile or two adjacent sides of the display tile, and said fastening means for fastening to a support structure is located outside of the perimeter or footprint of the display tile, and said fastening means extends beyond the perimeter or footprint of the display tile by a distance D that is larger than the nominal seam between two adjacent display tiles of the tiled display, and said fastening means are accessed from the display side of the display tile.

In embodiments of the present invention, an intermediary support element can be at least partially or temporarily supported by the support structure during assembly by means of a temporary fastening or fastening means such as magnets, before being fastened in place with a more permanent or semi-permanent joint, such as nuts and bolts. The temporary fastening or fastening means, such as magnets, can be glued or screwed to the intermediary support element. An advantage is that even while the weight of the display tile is supported by the support structure, it is possible to glide the intermediary support element and the display tile attached to it, into position.

It is an advantage of this aspect of the present invention, that it simplifies the tiling of display tiles when the distance, referred to as the seam between adjacent tiles, is too small to allow access to fastening means.

In a further aspect of the present invention, the intermediary support structure has additional attachment means to attach the display tile to a tool for alignment of the display tile with one or more display tiles already fastened to the support structure.

The additional attachment means can be on the same side or sides as the fastening or fastening means for fastening to the support structure. In particular, the attachment means for attachment of the display tile to the tool are adjacent to the fastening means for fastening to the support structure.

Embodiments of the present invention provide methods and means for positioning and/or alignment of display tiles in a tiled display, as well as an alignment mechanism or method to adjust the relative position of adjacent display tiles as they are assembled to form a tiled display. Embodiments of the present invention provide methods of and means for making or operating such display tiles and tiled displays. The present invention relates to methods of or means for maintenance of display tiles, including replacement of tiles.

The following are aspects of embodiments of the present invention starting with aspect 1 and going up to aspect 81:

1. An intermediary support structure with fastening means for fastening to a back side of a display tile, the display tile having several edges and a perimeter or footprint, further comprising a first fastener or first fastening means for fastening the intermediary support structure to a support structure supporting multiple display tiles, the intermediary support structure being characterized by:

the first fastening means for fastening to a support structure being distributed along one edge of the display tile or along two adjacent edges of the display tile; and said first fastening means for fastening to a support structure being located outside of the perimeter or footprint of the display tile, said fastening means extending beyond the perimeter or footprint of the display tile by a distance D that is larger than the nominal seam between two adjacent display tile of the tiled display and said fastening means are configured to be accessed from the display side of the display tile.

2. An intermediary support structure according to aspect 1 wherein a seam between adjacent tiles is too small to allow access to said fastening means.

3. An intermediary support structure according to aspect 1 or 2 further comprising attachment means to attach the display tile to a tool for alignment of the tile with one or more tiles already fastened to the support structure.

4. An intermediary support structure according to aspect 3 wherein the attachment means are on the same side or sides as the first fastening means for fastening to the support structure.

5. An intermediary support structure according to aspect 3 or 4 wherein the attachment means for attachment to the tool are adjacent to the first fastening means for fastening to the support structure.

6. An intermediary support structure according to any of the previous aspects wherein the intermediary support element supports a single tile.

7. An intermediary support structure according to any of the previous aspects which is configured to lie between the display tile and a support structure such as a frame or wall when in operation.

8. An intermediary support structure according to any of the previous aspects the support structure is configured to support multiple display tiles to form a tiled display.

9. An intermediary support structure according to any of the previous aspects wherein the support structure is a metallic plate.

10. An intermediary support structure according to aspect 9 wherein the metallic plate has first openings (401, 402, 403) optionally located at regular intervals.

11. An intermediary support structure according to aspect 10 wherein the first openings are for receiving first fasteners or first fastening means like e.g. bolts and optionally nuts which are loose or are fixed to the first openings to fasten display tiles to the support structure or to fasten an intermediary structure.

12. An intermediary support structure according to any of the previous aspects wherein said intermediary structure is configured to carry a single display tile.

13. An intermediary support structure according to any of the aspects 9 to 12 wherein the metal plate has stiffening means.

14. An intermediary support structure according to aspect 13 wherein the stiffening means comprises corrugations, or tubes fastened to the metal plate.

15. An intermediary support structure according to aspect 13 or 14 further comprising second fastening means.

16. An intermediary support structure according to aspect 15 wherein the second fastening means is for fastening the metal plate to a wall or to support trusses.

17. An intermediary support structure according to any of the previous aspects wherein the width of a seam, which is the distance between adjacent display tiles, does not allow to access first fastening means through the seam.

18. An intermediary support structure according to any of the previous aspects wherein the intermediary support element has third means for fastening to a support structure.

19. An intermediary support structure according to aspect 18, wherein the third fastening means include second openings (504A, 504B and 504C).

20. An intermediary support structure according to aspect 19 wherein the second openings are each located on one extremity of three extremities of a Y-shaped or T-shaped device.

21. An intermediary support structure according to aspect 20 wherein elongate fasteners are configured to pass through each second opening and a corresponding opening in the support structure.

22. An intermediary support element according to any of the previous aspects further comprising coupling means or fastening means adapted for coupling or fastening the intermediary support element to a display tile.

23. An intermediary support structure according to aspect 22 wherein the coupling or fastening means comprise holes that are configured to mate with protrusions such as pins on the display tile.

24. An intermediary support structure according to aspect 22 or 23 wherein the coupling or fastening means comprise protrusions such as, for example, pins that are adapted to mate with holes on the display tile.

25. An intermediary support structure according to any of the previous aspects further comprising second coupling means (505A, 505B and 505C) configured for manipulating the display tile without risk of damaging the display surface of the display tile.

26. An intermediary support structure according to any of the previous aspects wherein the display tile has a first surface (601) that is a front surface or display surface and a second surface (602) that is a back surface.

27. An intermediary support structure according to aspect 26 wherein the back surface (602) has a fastener optionally fastening means to be fastened to the intermediary support element 28. An intermediary support structure according to aspect 27 wherein the fastener or fastening means comprises pins and/or holes that mate with corresponding holes and/or pins on the intermediary support element.

29. An intermediary support structure according to aspect 27 or 28 wherein the intermediary support element is screwed and/or glued to the back surface of the display tile.

29. An intermediary support structure according to aspect 28 wherein, once the pins and/or holes of the intermediary support elements and the corresponding holes and pins on the back surface are mated, the display tile and the intermediary support element behave like a solid body.

30. An intermediary support structure according to any of the aspects 25 to 29 wherein the second coupling means (505A, 505B and 505C) are each located on one extremity of the Y-shaped or T-shaped device, respectively.

31. An intermediary support structure according to aspect 30 wherein the second coupling means (505A, 505B and 505C) include a third opening located adjacent a second opening (504A, 504B, 504C), respectively.

32. An intermediary support structure according any of the previous aspects wherein a second opening has a diameter D1, that is larger than the diameter of the opening 401 in the support structure.

33. An intermediary support structure according to aspect 32 configured to compensate for tolerances affecting the support structure, in particular the position of the openings (401, 402, 403, . . . ) and to allow for a nominal alignment of the display tiles.

34. A tiled display including an associated intermediary support structure according to any of the previous aspects wherein a first tile 801 is fastened to the support structure 400 by means of its associated intermediary support structure by means of a plurality of fastening means 8014A, 8014B and 8014C.

35. A tiled display according to aspect 34, wherein a second tile 802 is located next to the first tile.

36. A tiled display according to aspect 35, wherein the second tile 802 is located to the right of the first tile 801.

37. A tiled display according to aspect 36, wherein, when the second tile 802 is in its nominal position, the fastening means 8014C associated with the first tile 801, is under the second tile 802, but the fastening means 8024A, 8024B and 8024C associated with the second tile 802, are still accessible to introduce a fastening means such as a bolt which fastens the second tile 802 to the support structure.

38. A tiled display according to any of the aspects 35 to 37 wherein a third tile 803 is located next to the second tile.

39. A tiled display according to aspect 38 wherein the third tile 803 is located to the right of second tile 802.

40. A tiled display according to aspect 39, wherein, when the third tile 803 is in its nominal position, the fastening means 8024C associated with the second tile 802 is under the third tile 803 but the fastening means 8034A, 8034B and 8034C associated with the third tile 803 are still accessible to introduce a bolt and fasten the third tile 803 to the support structure.

41. A tiled display according to any of aspects 38 to 40 wherein a fourth tile 804 is located above the first tile 801.

42. A tiled display according to any of the aspects 38 to 41, wherein, when the fourth tile 804 is in its nominal position, the fastening means 8014A and 8014B are under the fourth tile 804, but the fastening means 8044A, 8044B and 8044C associated with the fourth tile 804 are still accessible to introduce bolts and fasten the tile 804 to the support structure.

43. A tiled display according to any of the aspects 38 to 42 wherein a fifth tile 805 is located to the right of the fourth tile 804 and above the second tile 802.

44. A tiled display according to aspect 43 wherein, when the fifth tile 805 is in its nominal position, the fastening means 8044C associated with the fourth tile and the fastening means 8024A and 8024B associated with the second tile 802 are under the fifth tile 805, but the fastening means 8054A, 8054B and 8054C associated with the fifth tile 805 are still accessible and the fifth tile 805 can be fastened to the support structure.

45. A tiled display according to any of the aspects 34 to 44, wherein access is provided to the plurality of fastening means during assembly of the tiled display from a front surface of the tiled display device even though the fastening means are larger than the distance between two adjacent display tiles.

46. A tiled display according to any of the aspects 34 to 45 wherein the plurality of fastening means are distributed along a single side or edge of the display tile.

47. A tiled display according to any of the aspects 34 to 44 wherein the plurality of fastening means used to fasten the display tile to the support structure are either on a single side or edge of the display tile or are distributed along two abutting sides or edges.

48. A tiled display according to any of the aspects 34 to 47 wherein an alignment of adjacent display tiles is done with the help of a spacer.

49. A tiled display according to aspect 48 wherein a spacer is made of an elastic material such as hard rubber with a thickness equal to the nominal seam between adjacent display tiles.

50. A tiled display according to aspect 48 or 49 wherein the spacers 114*a* and 114*b* are attached to each other and form a right angle.

51. A tiled display according to any of the aspects 34 to 50 comprising means to manipulate a display tile without having to contact its display surface, the means including a tool fastened to the intermediary support structure by means of fastening means (1105A, 1105B, 1105C on FIG. 11; 505A, 505B, 505C on FIG. 5).

52. A tiled display according to aspect 51 wherein the fastening means 1105A, 1105B, 1105C and/or fastening means 505A, 505B, 505C are part of a Y-shaped or T-shaped structure which includes means for fastening to a support structure, namely, openings 504A, 504B and 504C.

53. A tiled display according to aspect 51 or 52 wherein the fastening means for fastening to the tool are distributed along the same side(s) or edge(s) as the fastening means for fastening to the support structure.

54. A tiled display according to aspect 53, wherein the number and disposition of fastening means for fastening to the tool are the same as the number and disposition of fastening means for fastening to the support structure.

55. A tiled display according to any of the aspects 51 to 54 wherein the tool comprises handles that allow manipulation of the display tile by a human agent without contact with the display surface.

56. A tiled display according to any of the aspects 51 to 55 wherein the tool is fastened to the intermediary support element and the display tile at the same positions as the fastening means for fastening to the support structure, so that the display tile is positioned and fastened to the support structure at its nominal position without impediment by the tool, even if the dimensions of the fastening means for fastening to the tool are larger than the size of the seam.

57. A tiled display according to any of the aspects 34 to 55 wherein the positioning of the display tiles can be automated.

58. A tiled display according to any of the aspects 51 to 57 wherein the display tile is fastened to the tool and is translated and/or rotated by means of one or more motors and the relative position of the display tile with respect to one or two adjacent display tiles is monitored by one or more sensors.

59. A tiled display according to aspect 58 wherein the sensor is an optical camera or image sensor or, alternatively, the sensor is any sensor that can evaluate the distance between adjacent display tiles.

60. A tiled display according to aspect 59 wherein the distance between adjacent display tiles is evaluated on the basis of the position of adjacent corners of adjacent display tiles.

61. A tiled display according to any of the aspects 34 to 60 wherein alignment of display tile 121 with respect to display tile 120 can be evaluated by:
   The distance db between the bottom left corner 121*b* of display tile 121 and the bottom right corner 120*b* of display tile 120; and
   The distance da between the top left corner 121*a* of display tile 121 and the top right corner 120*a* of display tile 120.

62. A tiled display according to aspect 61, in which if the distances da and db are different, then the right side 120R of display tile 120 is not parallel to the left side 121L of display tile 121 and if the sides 120R and 120L are not parallel, a motor can rotate the display tile by e.g. applying a torque to the display tile by the intermediary of the tool fastened to the display tile 121 by means of the fastening means 1215A, 1215B and 1215C.

63. A tiled display according to aspect 61 or 62 wherein if both distances da and db are equal but different from a nominal distance d0, the display tile 121 can be translated by the intermediary of the tool.

64. A tiled display according to any of the aspects 34 to 63 wherein if the two tiles are aligned, one display tile 121 is fastened to the support structure with the fastening means 1214A, 1214B and 1214C.

65. A tiled display according to any of the aspects 34 to 44 wherein the alignment of a display tile 132 is made by monitoring the relative positions of three of its corners (132*a*, 132*b*, 132*c*) with respect to the corners of display tile 130 (corners 130*a* and 130*b* on the right side of the display tile 130) and of display tile 131 (corners 131*a* and 131*b* on the top side of display tile 131).

66. A tiled display according to aspect 65 wherein the distances between corners of tile 130 and the corresponding corners of tile 132 are evaluated as well as the distance between corners of tile 132 and the corresponding corners of tile 131:
   The distance db1 between the bottom left corner 132*b* of display tile 132 and the bottom right corner 130*b* of display tile 130; and
   The distance da1 between the top left corner 132*a* of display tile 132 and the top right corner 130*a* of display tile 130,
   The distance da2 between the top left corner 131*a* of display tile 131 and the bottom left corner 132*b* of display tile 132; and
   The distance db2 between the top right corner 131*b* of display tile 131 and the bottom right corner 132*c* of display tile 132.

67. A tiled display according to aspect 66 wherein if the right side 130R of display tile 130 is parallel to the left side 132L of display tile 132, then the distances da1 and db1 are equal.

68. A tiled display according to aspect 66 wherein if the top side 131Top of display tile 131 is parallel to the bottom side 132Bot of the display tile, then the distances da2 and db2 are equal.

69 A tiled display according to any of the aspects 67 or 68 wherein if the distances da1, da2, db1 and db2 differ from their nominal value, wherein the nominal value is the value when the seam is as expected, it is necessary to translate the display tile 132.

70. A tiled display according to any of the aspects 34 to 69 wherein the display tile and the intermediary support structure are attached to one another by means of pins and holes, and if one of the tiles is damaged, it is extractable while leaving the intermediary support structure fastened to the support structure.

71. A tiled display according to any of the aspects 34 to 70 further comprising trusses arching over the display surfaces which interact with the fastening means like disposed around one or two abutting sides of the display tile.

72. A tiled display according to any of the aspects 34 to 71 wherein two or three sensors are fastened to a tool so as to have the corners of the display tile in their respective field of view.

73. A tiled display according to aspect 72, wherein the sensors are image sensors.

74. A tiled display according to any of the aspects 65 to 73 wherein the corners to be monitored are the corners which are closest to the display tiles already fastened to the support structure (e.g. 400) with which the display tile is aligned.

75. A tiled display according to aspect 74 wherein if the means for fastening to the support structure are along the top and right side of a display tile, cameras have in their field of view the top left corner the bottom left corner and the bottom right corner, respectively.

76. A tiled display according to aspect 74 wherein the corners that used to evaluate the seam or the distance between display tiles are those corners that are part of the sides where there are no fastening means for fastening to the support structure and no fastening means for fastening to the tool.

77. A tiled display according to aspect 76 wherein the tool is fastened to an XY motorized gantry mechanism.

78. A tiled display according to aspect 77 wherein the motors of the gantry mechanism are controlled by controlling means like a microcontroller that uses the reading of the sensors to determine how the motors must be driven to bring the readings to their desired value.

79 A tiled display according to any of the aspects 66 to 78 wherein the distances da1, da2 are derived in any way known to the art, wherein when the sensors are cameras, ad-hoc image processing is used to determine the distances.

80. A tiled display according to aspect 79 wherein the distances are derived from images taken by the image sensor by, for example, counting the number of pixels that separate specific points indicated on the surface of the display tiles in the vicinity of the corners on each display tile.

81. A tiled display according to aspect 80 wherein one pixel at the apex of each corner is flashed on and off to facilitate its identification optionally by subtracting two consecutive images and thresholding, leaving only the flashing pixels.

BRIEF DESCRIPTION OF THE FIGURES

FIGS. 3*a* and 3*b* illustrate how a complex structure can be used to position a display tile with high precision while limiting contact with the display side of the tile.

FIGS. 9*a*, 9*b*, 9*c*, 9*d* show how fastening means can be distributed along a single side of the display tile.

DEFINITIONS AND ACRONYMS

Figure 1A:
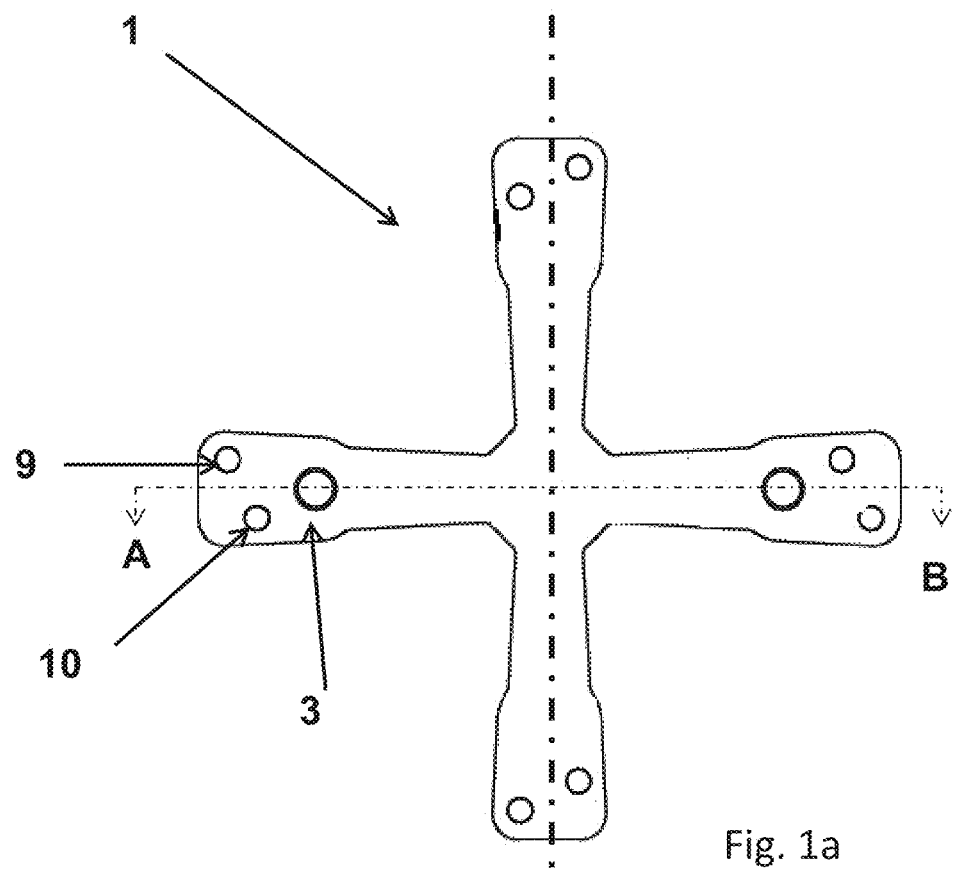
FIG. 1*a* shows a top view of a tile positioning device according to the prior art.
Figure 1B:
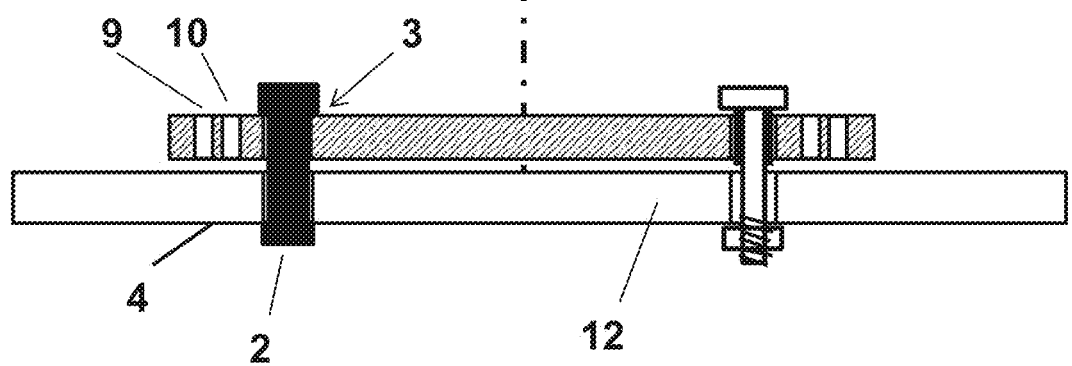
FIG. 1*b* shows a section view of a tile positioning device in accordance with the prior art.
Figure 2:
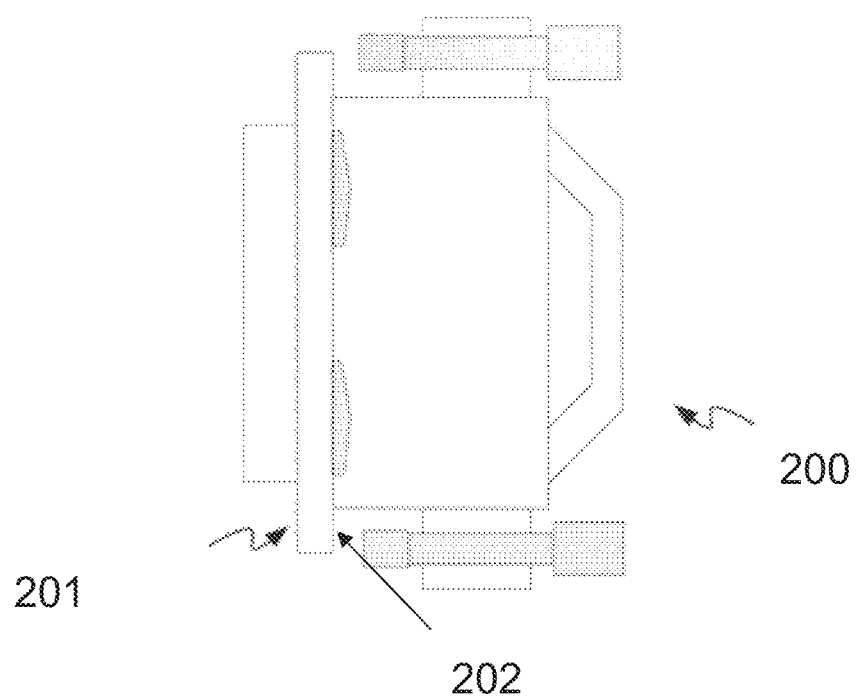
FIG. 2 illustrates a problem of the prior art (contact with surface of display tile).
Figure 3B:
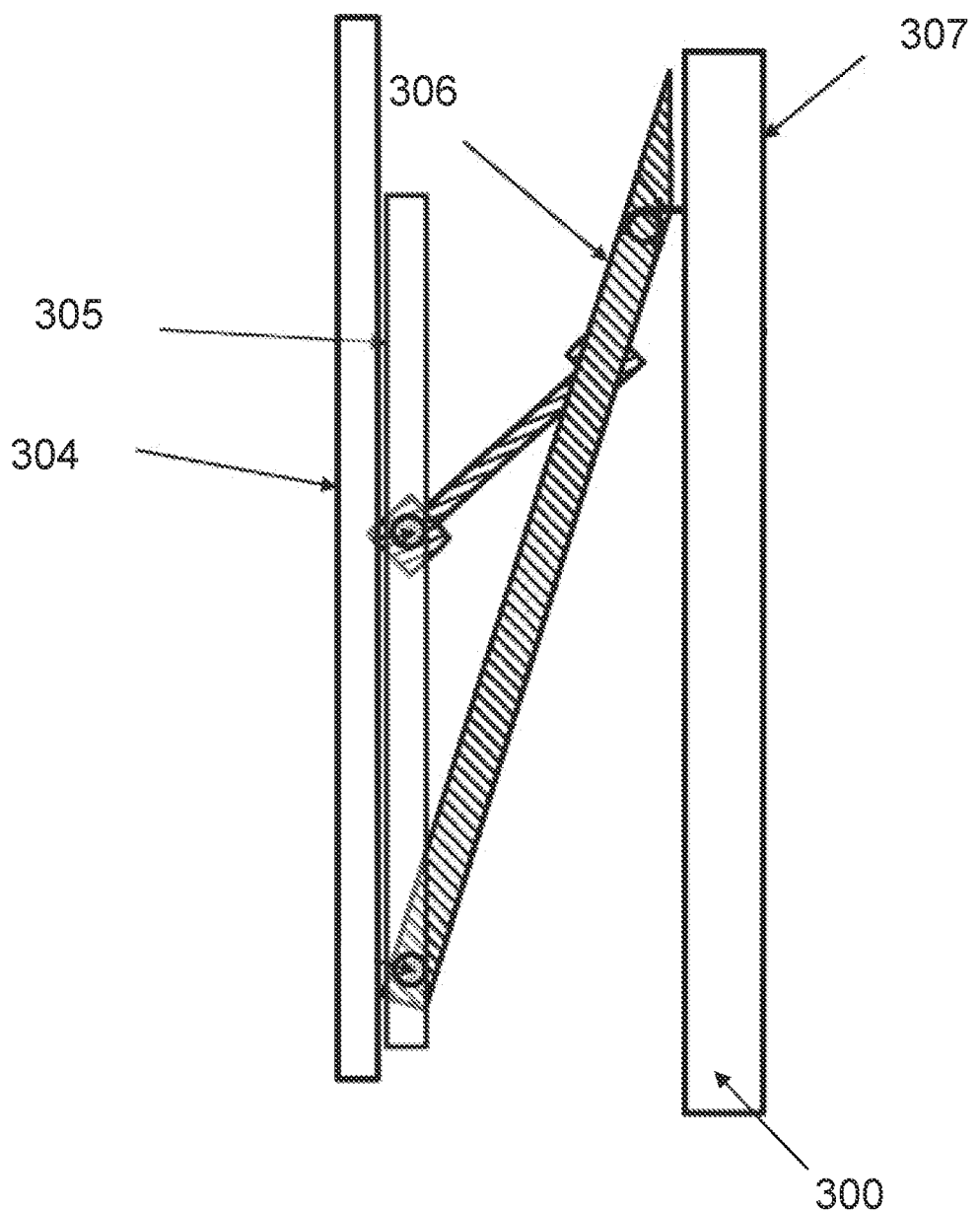

Display Element. An element of a display may be emissive, i.e. light is emitted from a front surface. The emission can be the result of activating light sources located in the display or the display can be transparent and light from a light source may be transmitted through the display before being emitted from the front surface of the display. Examples of emissive display elements are LED, OLED, plasma display, backlit liquid crystal display or light valve or a reflective liquid crystal display or light valve, etc.

Examples of reflective display elements are front lit liquid crystal light valve.

A Pixel is a picture element being an addressable unit, a plurality of which provides the capacity of a display tile or a display to display an arbitrary image.

A Display Tile has a front side or surface and a back side or surface. The front and back side are first and second major surfaces as these are the largest. The front side is the side which has light emitting pixels. The display tile has lateral sides or edges.

If a display tile is rectangular in shape, then there are four lateral sides or edges. Pairs of lateral sides oppose each other and are parallel to each other. A lateral side or edge is perpendicular to the adjoining lateral side or edge.

LED. Light Emitting Diode.

OLED. Organic light emitting diode.

Nominal. According to plans, as expected. Relating to a designated or theoretical size.

Permanent joint can only be separated by causing damage to the materials used in the joint. A permanent joint is usually designed to be a joint where it is unlikely that the joint will be dismantled under any servicing situation.

Semi-permanent joint: can be dismantled at least on a limited number of occasions, but may result in loss or damage to the fastening system and/or material included within the joint. Separation may require an additional process, for example plastic deformation. A semi-permanent joint can be used when disassembly is not performed as part of regular servicing, but for specific reasons.

Non-permanent joint: can be separated without special measures or damage to the fastening system and/or materials included within the joint. A non-permanent joint is suited to situations where regular dismantling is required, for example for regular maintenance.

Temporary joint: can be assembled and disassembled easily. An example is a magnet and a ferromagnetic material such as a steel sheet, hooks and loops such as Velcro™, hook and eye latch, as well as a pin and a hole for the pin or similar. Hook-and-loop fasteners, hook-and-pile fasteners or touch fasteners comprise two components: typically, two fabric strips which have a first component with tiny hooks, and a second component with small loops. Hooks and loops can be made from a plastic material. When the two are pressed together the hooks catch in the loops and the two pieces fasten or bind temporarily.

A counterbore is a cylindrical flat-bottomed hole allowing entry of a matched head of a bolt.

A countersink is a cone-shaped hole allowing a matched head of a bolt.

DETAILED DESCRIPTION OF THE INVENTION

In a first embodiment, an intermediary support structure or element is used to fasten a display tile to a support structure.

The intermediary support element supports a single tile. The intermediary support element and its associated tile (usually a single tile) forms a "module". The support element is intermediary because it lies between the display tile and a support structure such as a frame or wall. The support structure supports multiple display tiles to form a tiled display. It is an advantage of embodiments of the present invention to be able to align adjacent display tiles to a high degree of precision and yet allow the support structure to be affected by tolerances worse than the required precision for the alignment. For instance, in one embodiment, the support structure can be a metallic plate as illustrated on FIG. 4. The metallic plate 400 has openings 401, 402, 403, for example at regular intervals. The openings 401, 402, 403 are for receiving fasteners or fastening means, like for example, permanent or semi-permanent joints such as bolts to fasten display tiles (footprint 404 indicates the position of a still to be fastened display tile) to the support structure or more precisely, as will be described later, to fasten an intermediary structure, said intermediary structure being able to carry a display tile. The tile and its associated intermediary structure form a module, whereby there is preferably only one tile in a module. The position of the openings like 401, 402, 403 . . . is affected by (determined by) tolerances that can be worse than the tolerance or precision required for the relative position of adjacent display tiles.

Figure 4:
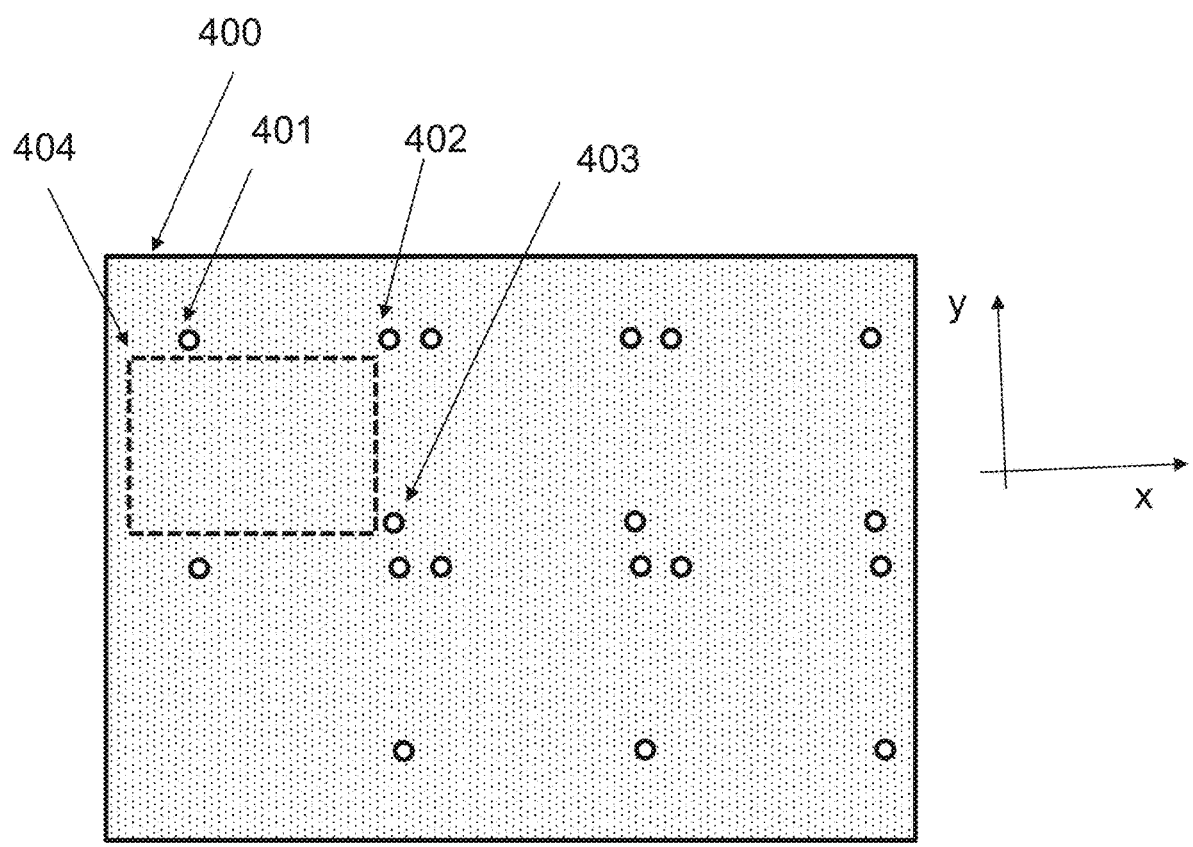
FIG. 4 shows an example of a support structure that can be used with the present invention.

In any of the embodiments, the metal plate 400 can have stiffening means not shown (e.g. corrugations, tubes fastened to the metal plate, etc.) as well as additional fastening means (e.g. for fastening the metal plate to a wall or support trusses) not shown on FIG. 4. The material with which the metal plate is made, can be a galvanized sheet, for example Zincor. A Zincor plate is an electrolytically galvanized steel sheet. The zinc coating can have a thickness of 2.5 microns. In most cases, DC01 steel type is used as the base material.

As will be described below, the intermediary support element solves several problems that affects high resolution tiled displays for which the seam (the distance between adjacent display tiles) is typically smaller than 1.2 mm and does not allow to access fastening means through the seam as the gap is too small.

Figure 5:
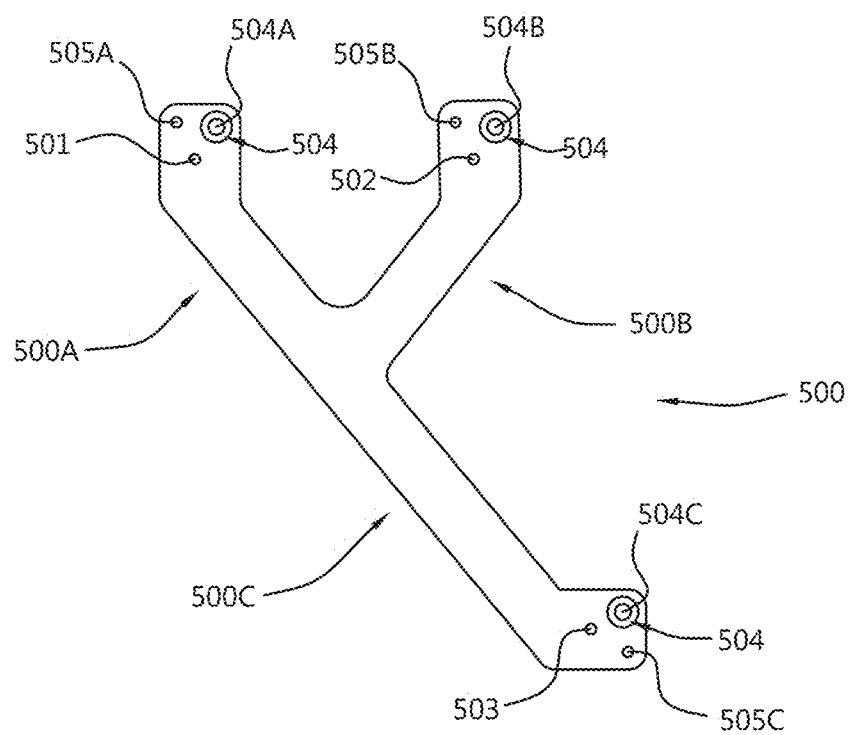
FIG. 5 shows an example of intermediary support structure according to an embodiment of the present invention.

FIG. 5 shows an example of intermediary support element 500 according to an embodiment of the present invention.

The intermediary support element 500 has means for fastening to a support structure 400. The fastening means can include, for example, openings 504A, 504B and 504C. Each of these openings 504A, 504B and 504C can be located at one extremity of a Y-shaped (for example with legs 500A, 500B and 500C) or T-shaped device. Elongate fasteners such as bolts (not shown) can/will go through each opening (e.g. each one of 504A, 505B, 505C) and a corresponding opening, e.g. 401, 402, 403, respectively, in the support structure 400. In the examples of FIGS. 4 and 5: a first elongate fastener, which will form a semi-permanent joint or a non-permanent joint such as with a bolt, can go through opening 504A and opening 401, a second elongate fastener which will form a semi-permanent joint or a non-permanent joint, such as with a bolt, can go through opening 504B and opening 402 and a third elongate fastener which will form a semi-permanent joint or a non-permanent joint, such as with a bolt, which can go through opening 504C and 403. The intermediary support element 500 has coupling means or fastening means for coupling or fastening to a display tile, e.g. with a non-permanent joint, for example to one display tile. The coupling or fastening means can be for example holes 501, 502, 503 that can mate with protrusions such as pins on the display tile. Alternatively or additionally, the coupling or fastening means can be protrusions such as e.g. pins that can mate with or enter holes on the display tile. A footprint 404 of the display tile that will be coupled to the intermediary support structure 500 is indicated on FIG. 4.

The intermediary support element can be made, for instance, of Sheet-metal aluminium (e.g. EN_AW-5052_ALMG2_5_H32). Other examples of material are injection moulding aluminium (e.g. EN_AC-42000_ALSI7MG_F) or injection moulding glass reinforced plastic (e.g. PPS).

In another embodiment, another coupling means 505A, 505B and 505C can be used for manipulating the display tile without risk of damaging the display surface of the display tile coupled to the intermediary support structure 500. Coupling means 505A, 505B and 505C can comprise holes each located on one of the three extremities of the T or Y-shaped device as illustrated on FIG. 5.

Alternatively, only two coupling means are used: for instance 505A and 505C.

Figure 6:
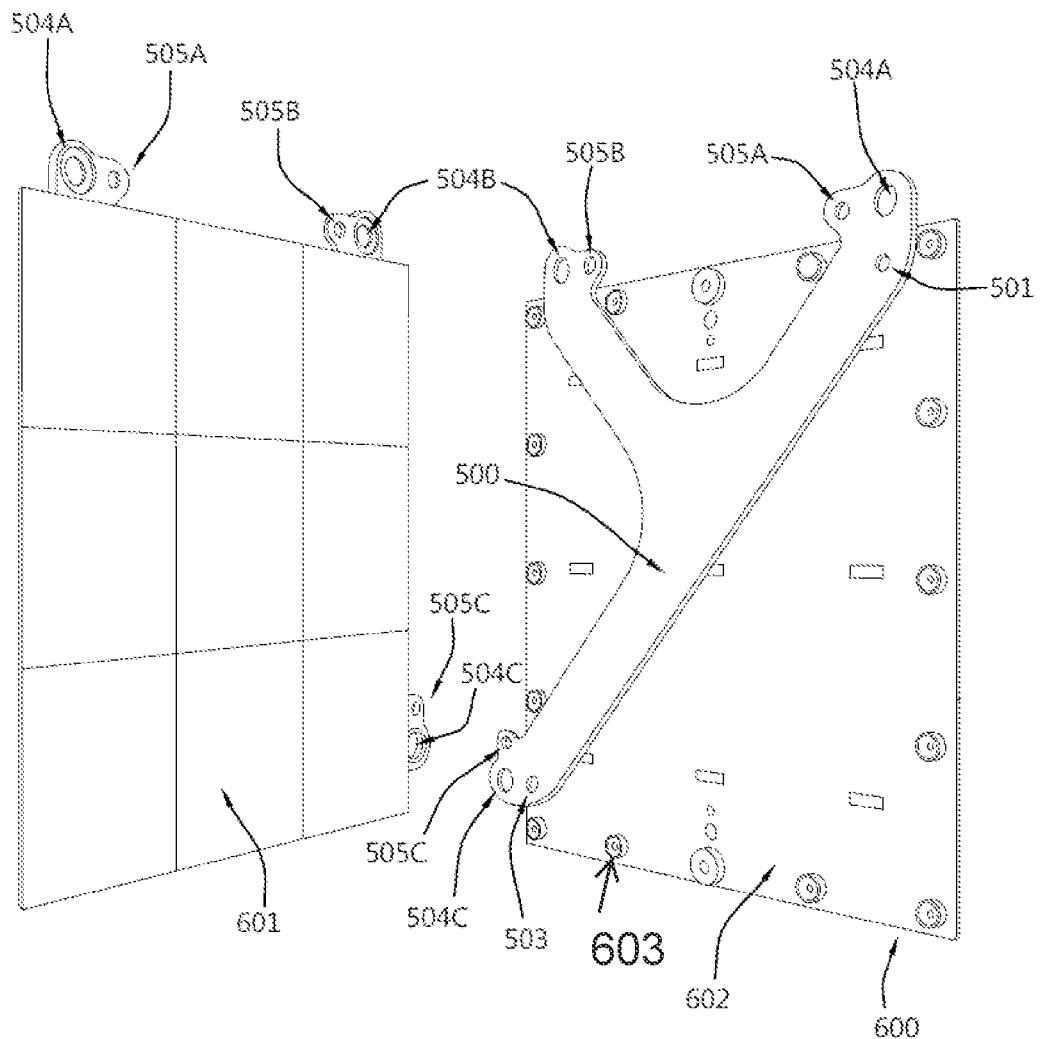
FIG. 6 shows an example of a display tile which is assembled according to an embodiment of the present invention.

FIG. 6 illustrates in a perspective view how the intermediary support element 500, e.g. in the form of the T- or Y-shaped device, is coupled to a display tile according to an embodiment of the present invention.

The display tile 600 has a first surface 601 that is a front surface or display surface. The first surface 601 is the surface on which display elements are visible. The display elements can be protected by a coating like, for instance, an anti-reflection coating. Such coating can, all too often, easily be scratched.

The display elements can be light sources such as, for example, Light Emitting Diodes or Organic Light Emitting Diodes. A display tile comprises an array of N×M light emitters such as LEDs or OLEDs. In the following, only LEDs will be mentioned, but each such mentioning includes the same disclosure with OLEDs and each such embodiment being herewith included in this disclosure. The array can be an array of sub-arrays with n×m LED where n<N and m<M. A sub-array of n×m LEDs can be mounted on a printed circuit board to form a so-called stamp. Two or more stamps are assembled on a substrate of the display tile 500 to form an array of N×M LED.

The display tile has a second surface 602 that is a back surface. The back surface 602 can have fasteners such as fastening means to be fastened to the intermediary support element 500. The fastening means form a semi-permanent or non-permanent joint. The fastener or fastening means can be pins and/or holes that will mate with corresponding holes and/or pins on the intermediary support element 500. On FIG. 5, holes 501, 502 and 503 are drawn as illustrative examples. Such holes 501, 502 and 503, when the intermediary support element 500 is installed (as shown in FIG. 6), do not or do not need to extend outside of the perimeter or footprint of the display tile. Holes 504A, 504B, 504C and holes 505A, 505B, 505C do extend outside of the perimeter or footprint of the display tile (as shown in FIG. 6). The position of holes 504A, 504B, 504C and corresponding holes 505A, 505B, 505C, respectively, may be as shown as an example in FIG. 5 or, alternatively, as shown as another example in FIG. 6.

Alternatively, the intermediary support element 500 can be screwed and/or glued to the back surface 602 of the display tile 600. In yet another alternative embodiment, the intermediary support element 500 can be integral to and with the display tile 600.

Embodiments of the invention for which the intermediary support element 500 is not an integral part of the display tile 600, have an advantage. Once a tiled display has been assembled, it is then possible to remove a display tile in particular while leaving the corresponding intermediary support element fastened to the support structure and replace the display tile by another display tile, for example, for repair.

Removing the display tile, while leaving the intermediary support element, can be done in different ways. In a first example, if the seam is large enough, a hook like structure can be inserted to exert a force on the display tile in a direction normal to the display surface (along Z-direction) and "rip" the display tile apart from the intermediary support element.

If the seam is not large enough and/or if the risk of damaging a neighboring display tile is deemed too high, it is possible to disengage display tiles from their respective intermediary support element in the reverse order with respect to how they were first tiled, until one reaches the display tile that must be replaced. Once that tile has been replaced, the tiles that were removed are fastened again to their respective intermediary support elements. No new alignment needs to be performed, since the intermediary support elements remained fastened to the support structure and since these intermediary support elements compensate for the tolerances affecting the support structure. Once the pins and/or holes of the intermediary support elements 500 and the corresponding holes and/or pins on the back surface 602 are mated, the display tile and the intermediary support elements 500 behave like a solid body, i.e. they form a module.

The intermediary support element 500 and its display tile can be fastened to the support structure. Fastening to the support structure can be done, for instance, by means of suitable fasteners or fastening means, for example, a semi-permanent or non-permanent joint such as with bolts inserted through the openings 504A, 504B and 504C of the element 500, one bolt being inserted through one opening, and the corresponding openings 401, 402 and 403 of the support structure 400.

Figure 7A:
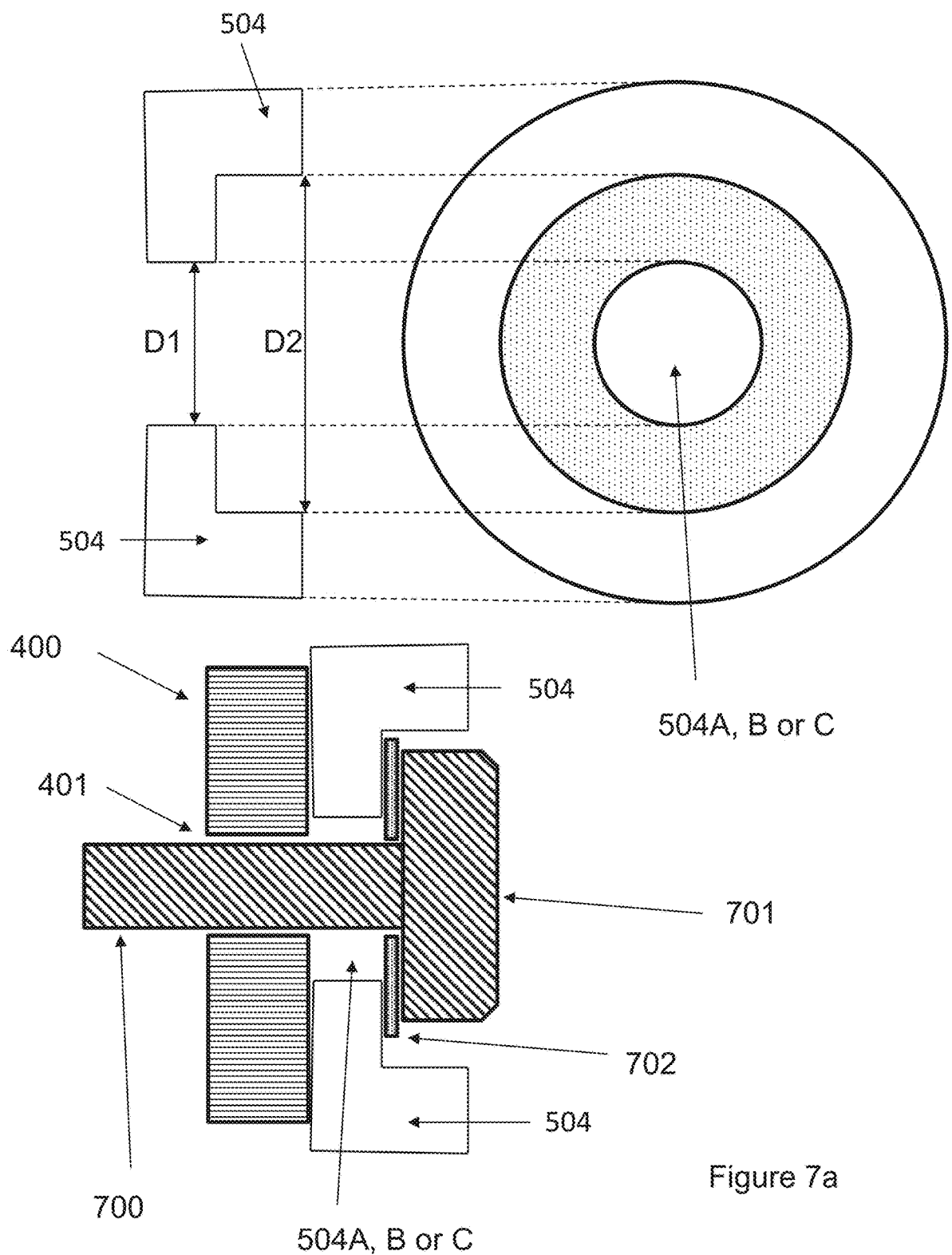
FIGS. 7*a* and 7*b* illustrate an example of fastening means and how they can compensate for the tolerances affecting the support structure.

FIG. 7a shows a top and side view of an opening like 504A, 504B or 504C. For example, the opening 504A has a diameter D1 that is larger than the diameter of the opening 401 in the support structure 400.

A module comprising a display tile is preferably made as separate parts. This is to be able to disassemble a module or a display tile in servicing or maintenance mode, without having to remove the modules or display tile next to it. To achieve this, a module or display tile can be released from its intermediary structure 500, while leaving the intermediary structure 500 mounted.

Figure 7B:
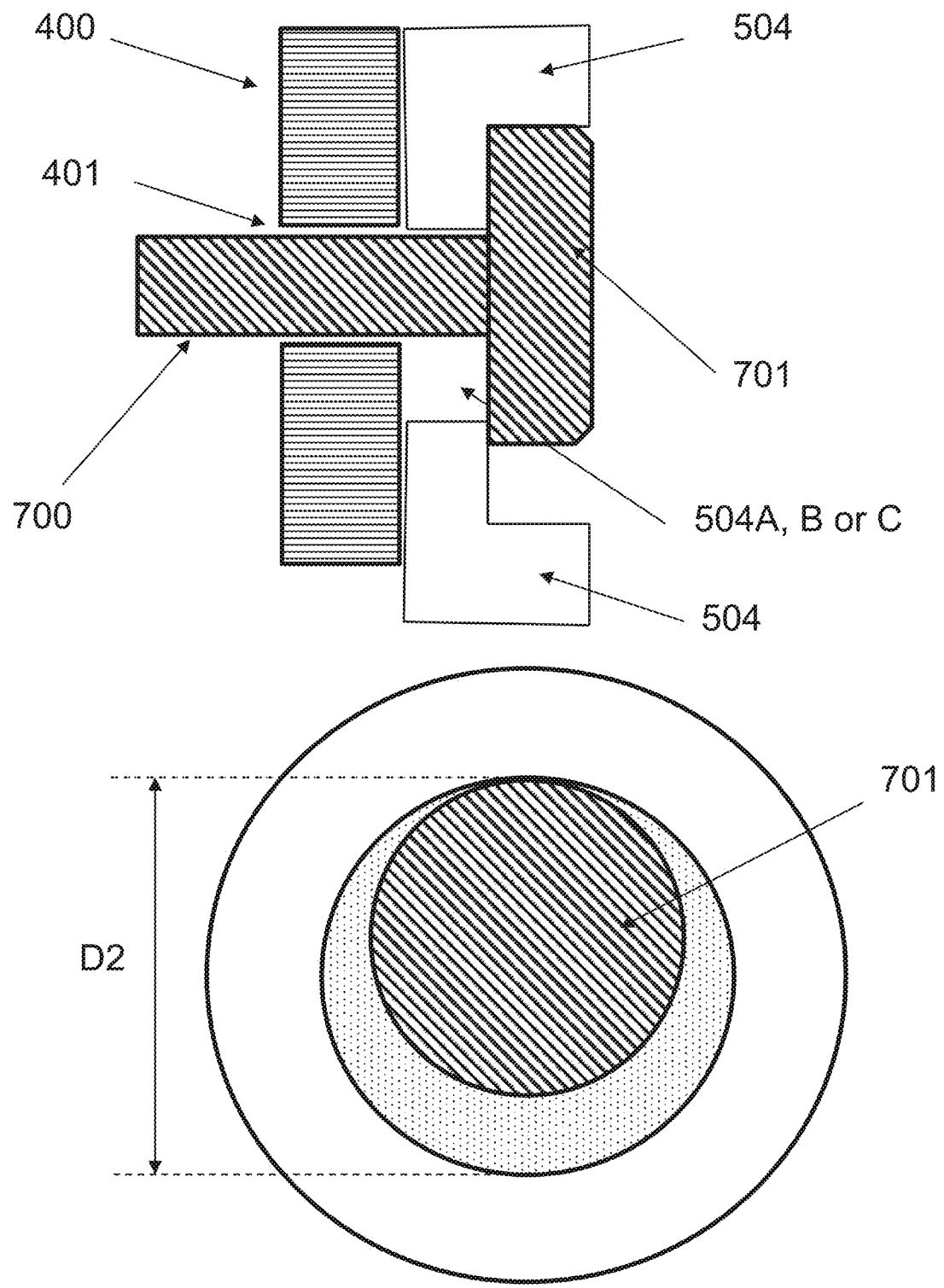

This difference is useful to compensate for tolerances affecting the support structure (in particular the position of the openings 401, 402, 403, etc.) and to allow for a nominal alignment of the display tiles. This compensation for tolerances is illustrated in FIGS. 7a and 7b. Even if the opening 401 and the opening 504A (504B, 504C) are not perfectly aligned, a bolt 700 can still be inserted through the opening 504A (504B, 504C) in part 504, which is a fixing part in the intermediary structure 500 and which is counterbored or countersunk, and the opening 401 in the support structure 400. The diameter of the head 701 of the bolt 700 is larger than the diameter D1 of the opening 504A (504B, 504C). Alternatively, a washer 702 with an outside diameter larger than D1 can be used. The diameter of the head 701 and/or of the washer 702 is smaller than a diameter D2 of the outer diameter of fixing part 504.

In yet another embodiment of the invention, the intermediary support element 500 can be partially supported by the support structure 400 during assembly by means of a temporary joint as can be provided by magnets before being fastened in place with bolts. The magnets can be glued or screwed to the intermediary support element 500. An advantage is that even while the weight of the display tile is supported by the support structure 400, it is possible to glide the intermediary support element 500 and the display tile attached to it, into position.

Magnets are preferably firmly mounted on the module and are attracted magnetically to the support structure which contains ferromagnetic material. The Y- or T-shape is located in between. To form joints, the magnets should be attracted to ferromagnetic material such as steel. The module is attracted magnetically in the Z-direction, e.g. with force of approximately 10 kg to the Zincor plate and can slide over the plate with force of approximately 4 kg. If frictional forces need to be reduced, this can be done with suitable coatings such as PTFE. Indeed, it should be easy to slide during alignment and strong enough to stay in place in Z-direction. In the XY plane, the module remains in place by securing the intermediary support element 500.

An example of a magnet that can be used, is a Neodymium (NdFeB) pot magnet sold by Webcraft GmbH (Industriepark 206 78244 Gottmadingen, Germany), with properties as indicated below:

Article ID: CSN-10
EAN 7640155431576
Material NdFeB
Pot diameter D 10 mm
Total height H 4.5 mm
Borehole d1 3 mm
Countersinking d2 4.8 mm
Countersinking t 0.9 mm
Tolerance +/−0.1 mm
Coating Nickel-plated (Ni—Cu—Ni)
Steel Q235 (China)
Magnetisation N38
Strength approx. 1.3 kg (approx. 12.7 N)
Max. working temperature 80° C.
Weight 2,0000 g A graphic of the force (expressed in kilogram) between the magnet and a sheet of steel or iron in function of the distance between the sheet and the magnet is given in https://www.supermagnete.be/eng/pot-magnets-with-countersunk-borehole/countersunk-pot-magnet-10 mm CSN-10. This is representative of the force exerted between such a magnet and the support structure 400. This magnet in a steel pot has a countersunk borehole and can be fastened with a countersunk screw. It is suitable for mounting solutions in the shopfitting and lighting industries as well as for household use.

Using several magnets fastened to the intermediary support element 500 that support a display tile, an attractive force of +/−100 N keeps the intermediary support element pressed against the support structure 400 in Zincor (the intermediary support element 500 is "sandwiched" between the magnets and the support structure 400). With typical materials used for the intermediary support element 500, the friction forces that oppose or restrict movement of the intermediary support element 500 in the plane of the support structure 400, are in the range of 20 to 50 N which is well within the range of forces that a manipulator (whether human or robot) can exert without problem. Once the intermediary support element 500 and the associated display tile are at their nominal position, bolts, like bolt 700, are used to fasten the intermediary support element 500 and the associated display tile to the support structure.

Figure 8A:
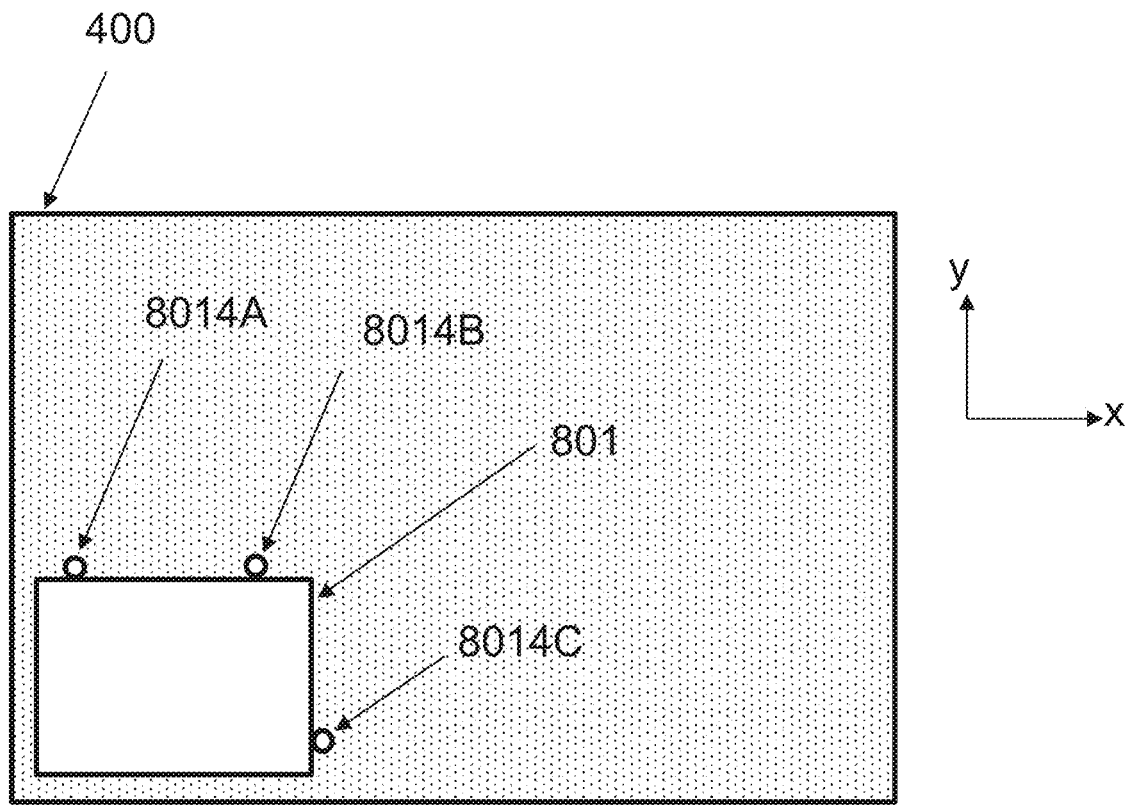
FIGS. 8*a*, 8*b*, 8*c*, 8*d*, 8*e* and 8*f* show an example of steps to assemble a tiled display in accordance with an embodiment of the present invention.

Alternatively or in combination with magnets on the element 500, magnets (like 603) can be distributed across the back surface 602 of the display tile 600. As in the example of FIG. 6, magnets (like 603) are distributed along the edges of the back surface 602. Referring to FIG. 8a, a first tile 801 is fastened to the support structure 400 by means of its associated intermediary support structure and fastening means 8014A, 8014B and 8014C. The fastening means 8014A, 8014B and 8014C can be part of a T- or Y-shaped device like the one illustrated on FIG. 5. Each of the fastening means 8014A, 8014B and 8014C can be located on one extremity of the three extremities of the T- or Y-shaped device.

Figure 8B:
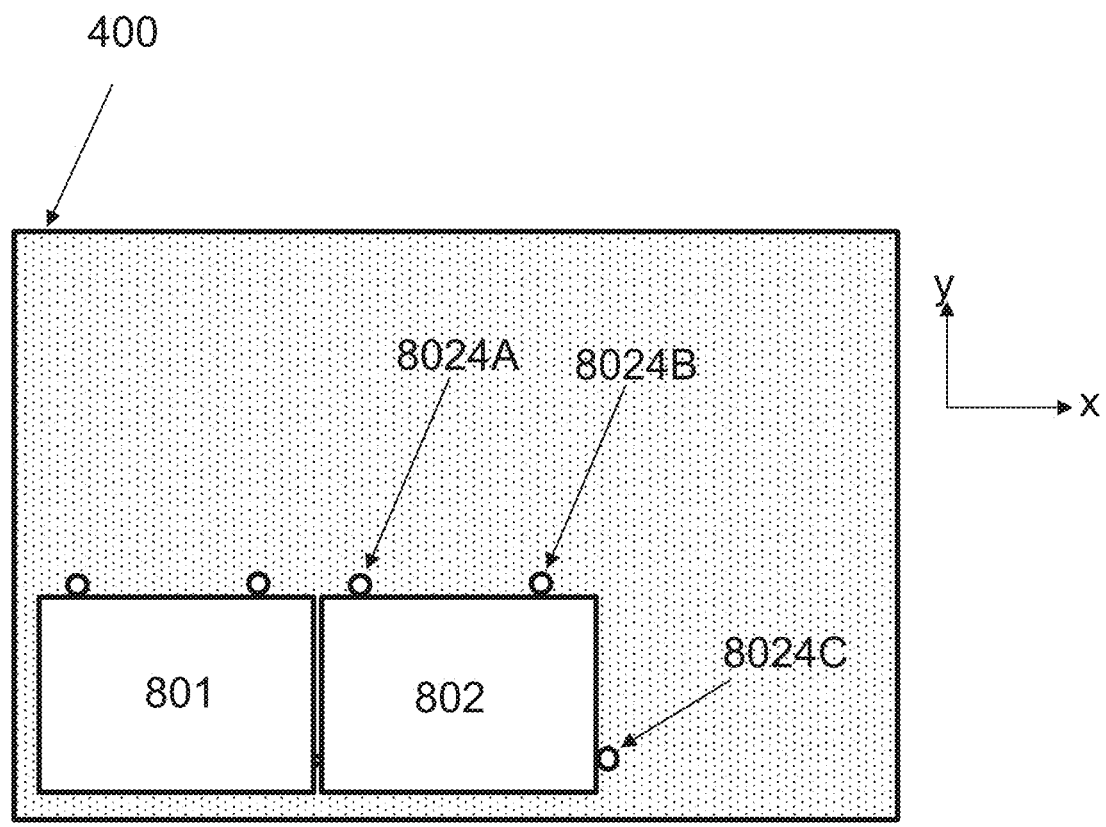

A second tile 802 is then placed next to the first tile. The tile 802 is placed, for example, to the right of tile 801. When the second tile 802 is in its nominal position, the fastening means 8014C associated with tile 801 is under the tile 802, but the fastening means 8024A, 8024B and 8024C associated with the tile 802 are still accessible to introduce a bolt and fasten the tile 802 to the support structure 400. This is illustrated on FIG. 8b. The openings in the support structure 400 to receive bolts are not shown.

Figure 8C:
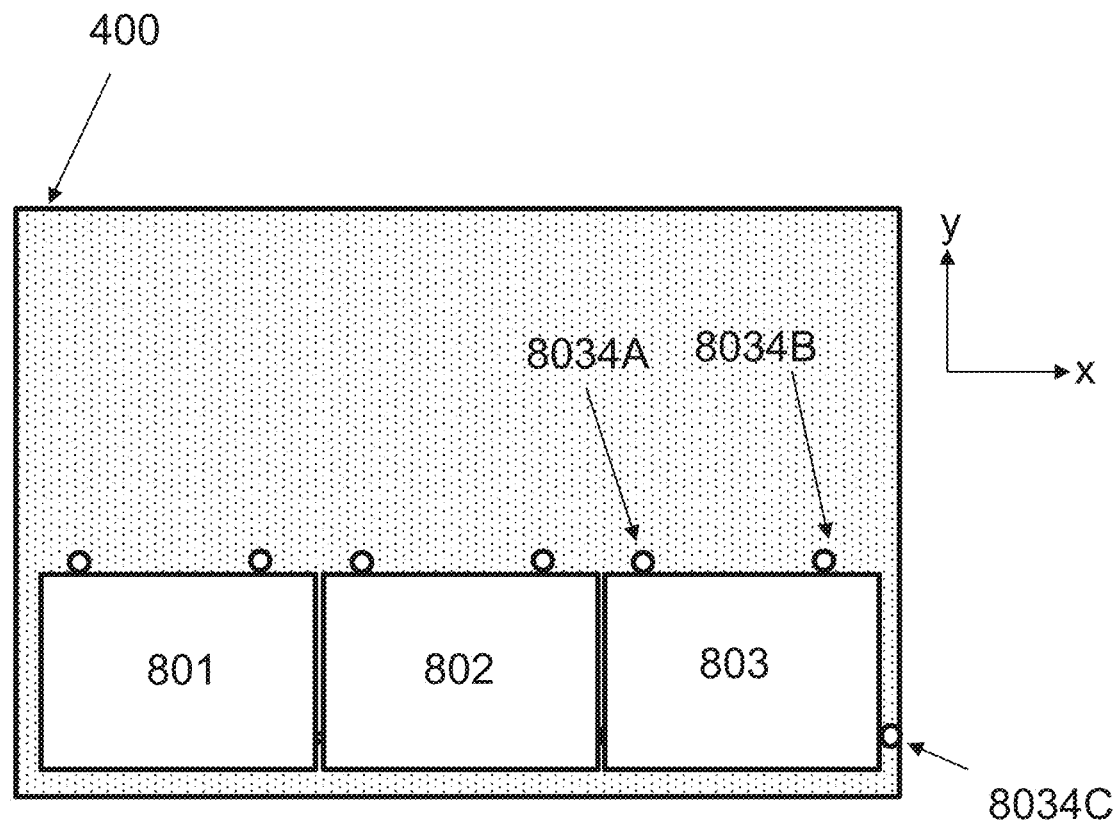

A third tile 803 is then placed next to the second tile 802. In the example of FIG. 8c, the tile 803 is placed to the right of tile 802. When the third tile 803 is in its nominal position, the fastening means 8024C associated with tile 802 is under the tile 803 but the fastening means 8034A, 8034B and 8034C associated with the tile 803 are still accessible to introduce a bolt and fasten the tile 803 to the support structure 400.

Figure 8D:
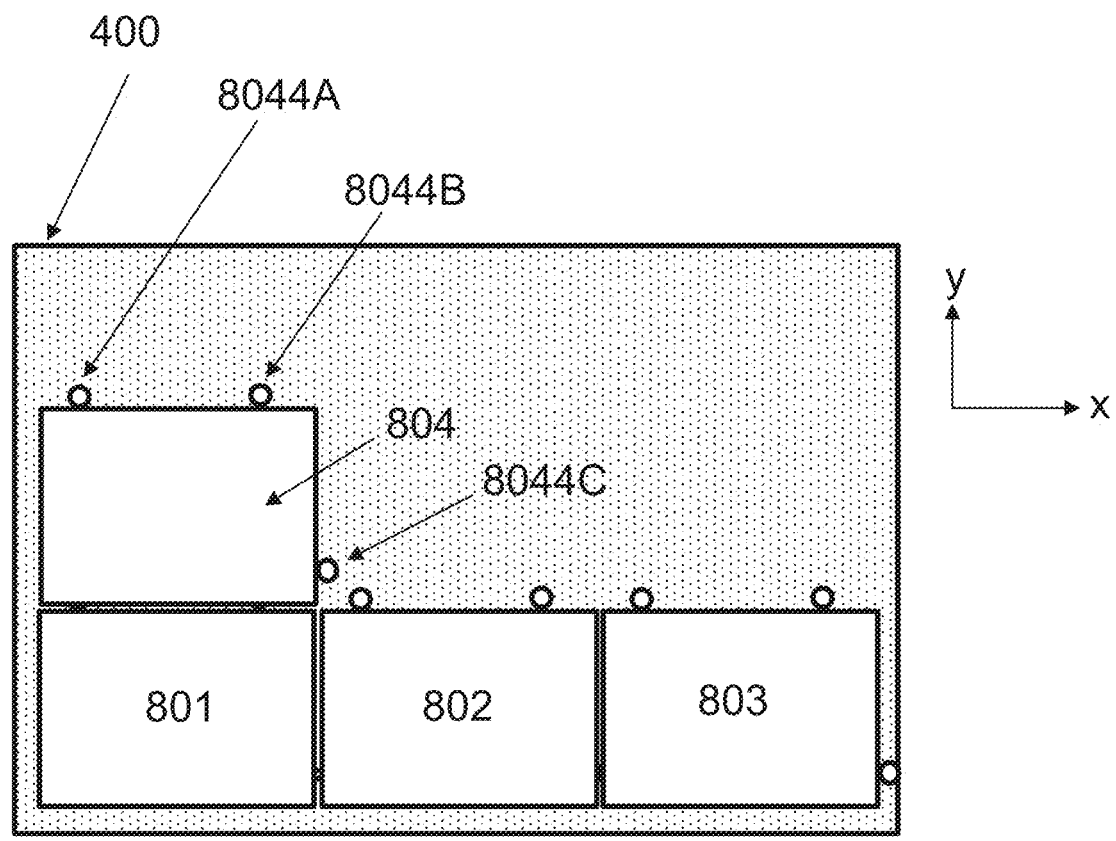

A fourth tile 804 can be placed above the first tile 801 as illustrated on FIG. 8d. When the fourth tile 804 is in its nominal position, the fastening means 8014A and 8014B are under the fourth tile 804 but the fastening means 8044A, 8044B and 8044C associated with the fourth tile 804 are still accessible to introduce bolts and fasten the tile 804 to the support structure.

Figure 8E:
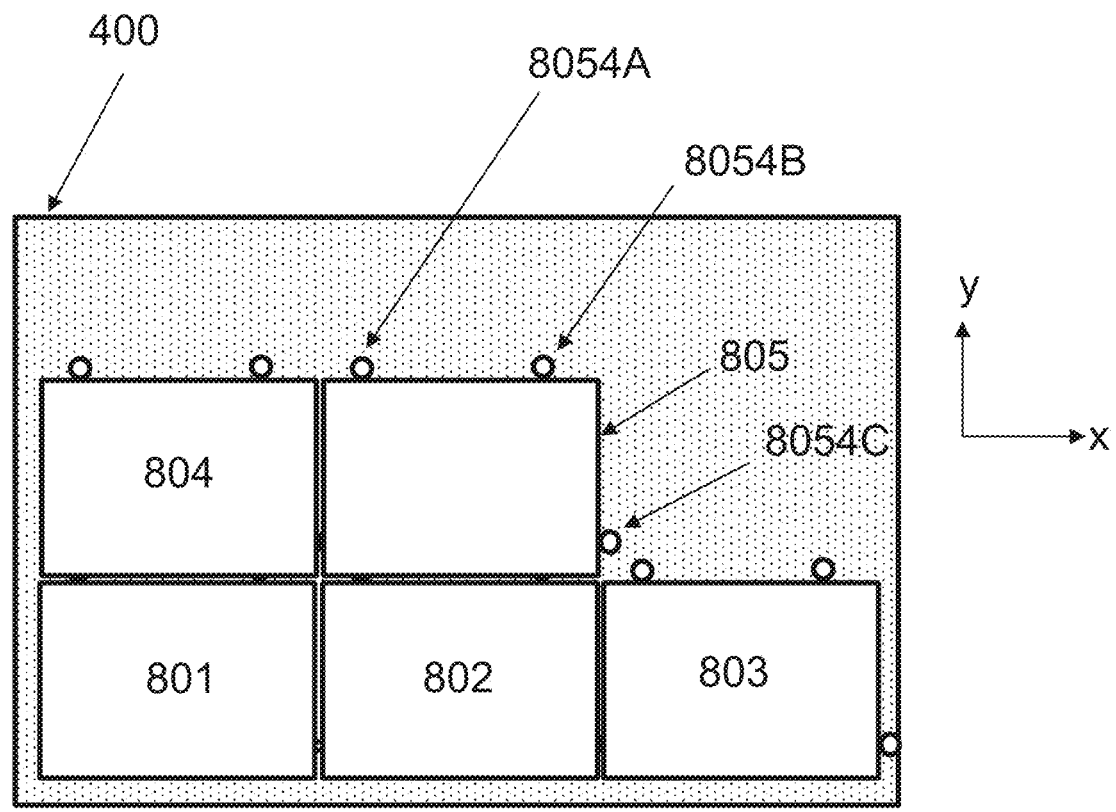

A fifth tile 805 can be placed to the right of the fourth tile 804 and above the second tile 802 as illustrated on FIG. 8e. When the fifth tile 805 is in its nominal position, the fastening means 8044C associated with the fourth tile 804 and the fastening means 8024A and 8024B associated with the second tile 802 are under the fifth tile 805, but the fastening means 8054A, 8054B and 8054C associated with the fifth tile 805 are still accessible and the fifth tile 805 can be fastened to the support structure 400. This illustrated on FIG. 8e.

The assembly of the tiled display can be pursued by adding tiles. In this example, the fastening means associated with a display tile are distributed on its top side and right side and, therefore, the assembly is done by assembling tiles from above and or the right of display tiles already fastened to the support structure.

Disassembling the tiled display can be done, in the example just given, from the top right corner and will be done towards the left and the bottom side of the assembly, one row at a time.

Figure 8F:
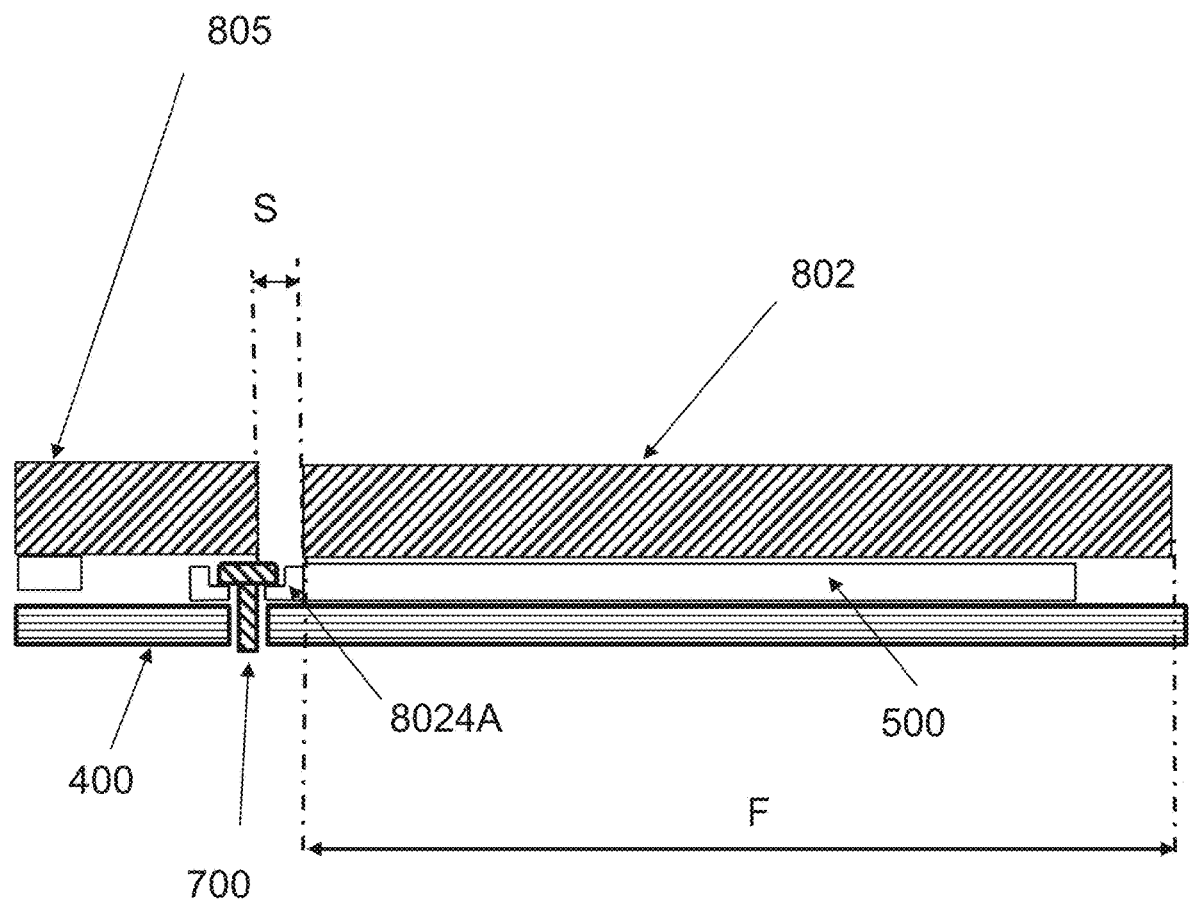

It is an advantage of this embodiment of the invention that no complex mechanism is required to access the fastening means during assembly of the tiled display from a front surface of the tiled display device, even though the fastening means are larger than the distance between two adjacent display tiles. FIG. 8f shows a cross section of the tiled display along a direction parallel to the axis Y of the tiled display that shows the position and dimensions of the fastening means, like 8024A, relative to the footprint F of the display tile 802 and the seam S between the display tiles 802 and 805. FIG. 8f emphasizes the fact that the fastening means 8024A:

Are outside of the footprint F of the display tile 802; and
Cannot be accessed through the seam S that exists between the adjacent display tiles 802 and 805.

Accessing the fastening means 8024A from a front side of the display is done either before the adjacent display tile 805 is fastened to the support structure 400 or after the display tile has been removed.

Alternatively, a defective display tile 600 can be removed from its associated intermediary support element 500 by means of one or more actuators in the display tile and/or in the intermediary support structure 500. The one or more actuators can be controlled by means of the same interface that is used to transmit data and control signals to a display tile or by separate means: using, for example, a wireless communication system such as an NFC connection, a Bluetooth connection, WiFi connection or a simple FM signal or a magnetic signal, positioning a magnet at a specific place. For instance, if a pin and hole combination(s) is used to attach the display tile 600 to the intermediate support structure 500, a linear actuator at the back of the display tile can, when activated, trigger the release of the pin and hole combination(s). In that case, all the other display tiles and the corresponding intermediary support element remain in place. The position of the new display tile replacing the defective display tile is already determined by the pin and hole combination(s) used to fasten the new display tile to the intermediary support structure.

The same advantages as described above can be obtained if the fastening means are distributed along a single side of the display tile as illustrated on FIGS. 9a, 9b, 9c and 9d.

Figure 10:
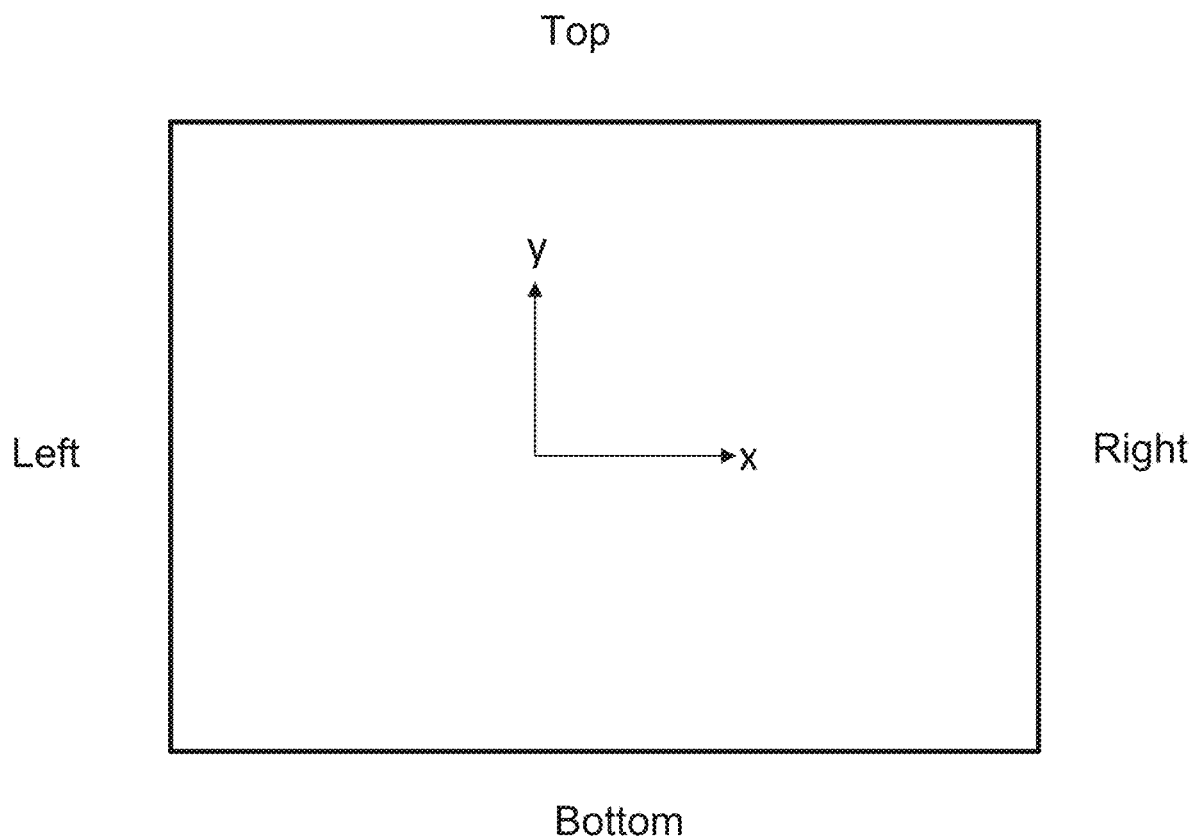
FIG. 10 shows the relative positions of the side that are identified as "top", "bottom", "left" and "right".

A display tile can be rectangular, for example an oblong or a square. The fastening means used to fasten the display tile to the support structure are either on a single side of the display tile or are distributed along two abutting sides. If two abutting sides are used, they are for instance: (left, top), (top, right) as in the examples of FIGS. 8a to 8e, (right, bottom) and (bottom, left). The relative positions of the top, right, bottom and left sides are seen on FIG. 10.

Figure 11:
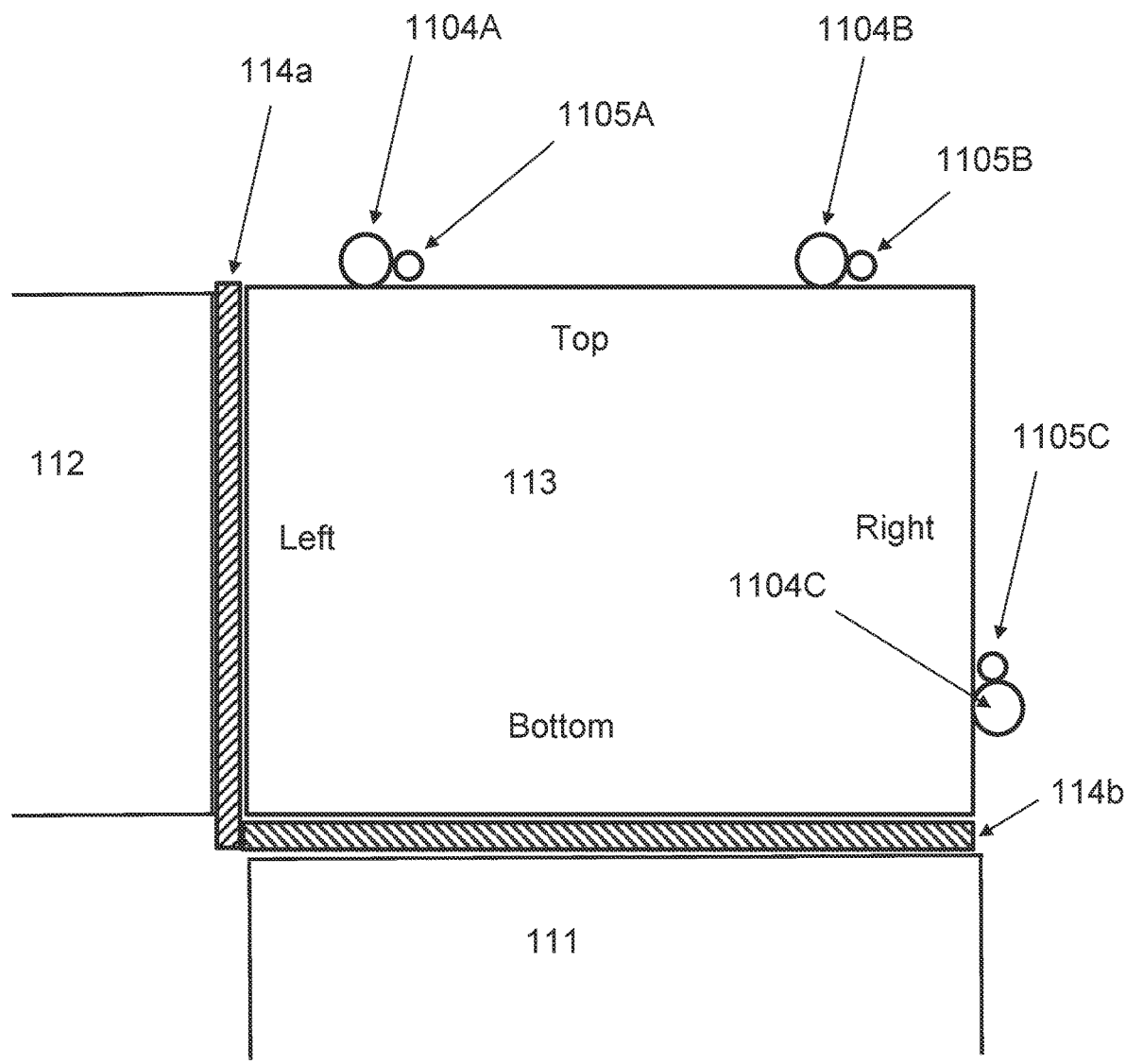
FIG. 11 shows how spacers can be used to help with the alignment according to an embodiment of the present invention.

In a further aspect of the invention, the alignment of adjacent display tiles can be done for example with the help of a spacer as illustrated on FIG. 11.

In its simplest form a spacer like 114a and 114b can be made of, for example, hard rubber with a thickness equal to the nominal seam between adjacent display tiles 112 and 113 and between adjacent display tiles 111 and 113. The spacers 114a and 114b can be attached to each other and form a right angle. The thickness Th of the spacer is equal to the nominal distance between adjacent display tiles.

To manipulate a display tile without having to contact its display surface, a tool can be fastened to the intermediary support structure by means of fastening means like 1105A,

1105B, 1105C on FIGS. 11 and 505A, 505B, 505C on FIG. 5. The fastening means 1105A, 1105B, 1105C shown on FIG. 11 and fastening means 505A, 505B, 505C on FIG. 5 or FIG. 6 can be part of a Y-shaped structure which can include means for fastening to a support structure, namely, for example, openings 504A, 504B and 504C and fastening means 1104A, 1104B and 1104C.

The fastening means for fastening to the tool can be distributed along the same side or sides as the fastening means for fastening to the support structure. The number and disposition of fastening means for fastening to the tool can be identical to the number and disposition of fastening means for fastening to the support structure as illustrated on e.g. FIGS. 5 and 11.

The tool can be mere handles that allow manipulation of the display tile by a human agent without contact with the display surface. The fact that the tool is fastened to the intermediary support element and the display tile at the same positions as the fastening means for fastening to the support structure mean that the display tile can be positioned and fastened to the support structure at its nominal position without impediment by the tool, even if the dimensions of the fastening means for fastening to the tool are larger than the size of the seam.

Alternatively, the positioning of the display tiles can be automated. A display tile fastened to the tool is translated and/or rotated by means of one or more motors and the relative position of the display tile with respect to one or two adjacent tiles is monitored by one or more sensor(s).

The sensor can be an optical camera or image sensor. Alternatively, the sensor can be any sensor that can evaluate the distance between adjacent display tiles.

The distance between adjacent display tiles can be evaluated on the basis of the position of adjacent corners of adjacent display tiles.

Figure 12:
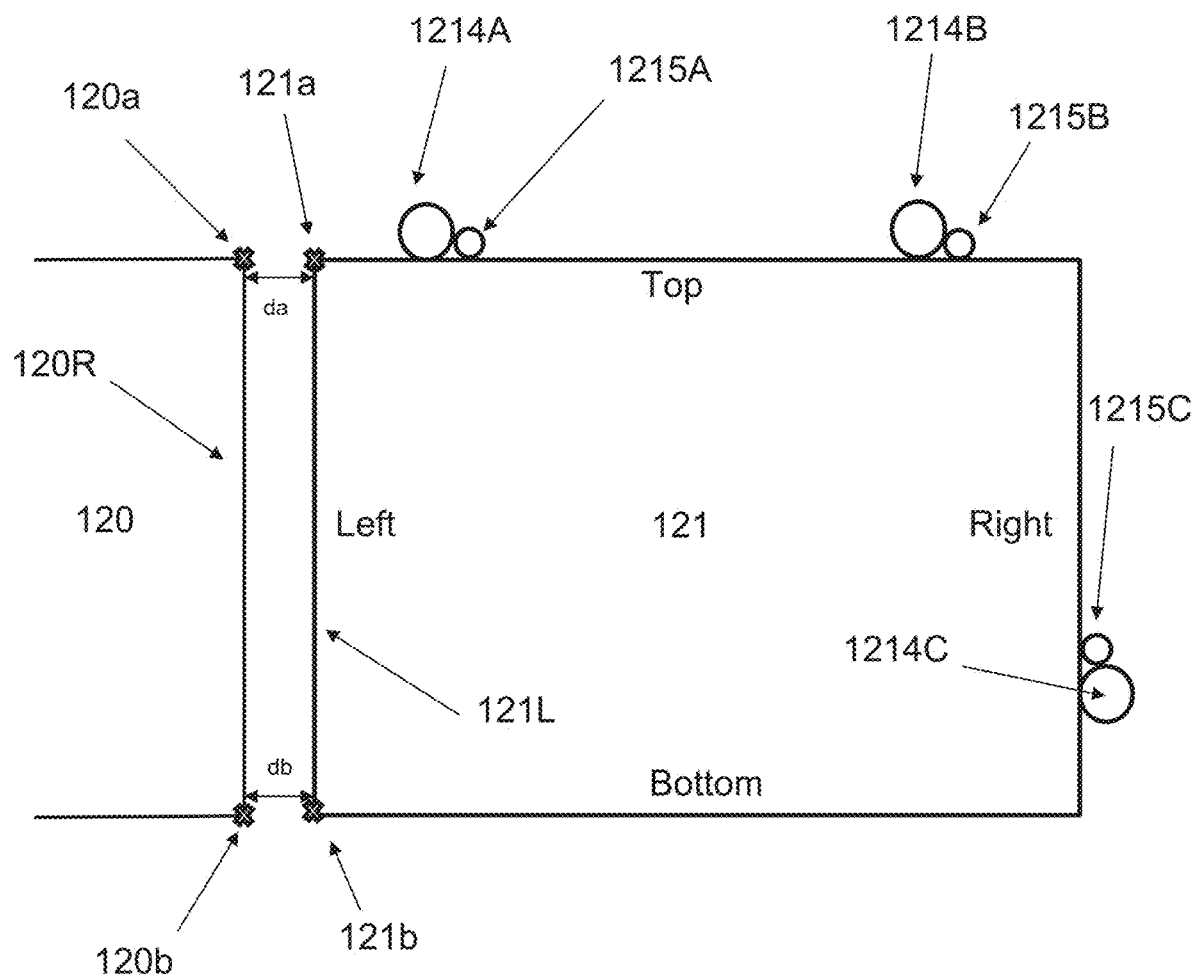
FIG. 12 shows examples of the parameters than can be used to evaluate the alignment of a display tile with a single adjacent display tile as used with embodiments of the present invention.

In the example of FIG. 12, the alignment of display tile 121 with respect to display tile 120 can be evaluated by:

The distance db between the bottom left corner 121b of display tile 121 and the bottom right corner 120b of display tile 120; and The distance da between the top left corner 121a of display tile 121 and the top right corner 120a of display tile 120.

If the distances da and db are different, then the right side 120R of display tile 120 cannot be parallel to the left side 121L of display tile 121. If the sides 120R and 120L are not parallel, a person or a motor can rotate the display tile by, for example, applying a torque to the display tile by the intermediary of the tool fastened to the display tile 121 by means of the fastening means 1215A, 1215B and 1215C.

If both distances da and db are equal but different from a nominal distance d0, the display tile 121 can be translated by the intermediary of the tool.

Once the two tiles are aligned, the display tile 121 can be fastened to the support structure with the fastening means 1214A, 1214B and 1214C as was described earlier.

Figure 13:
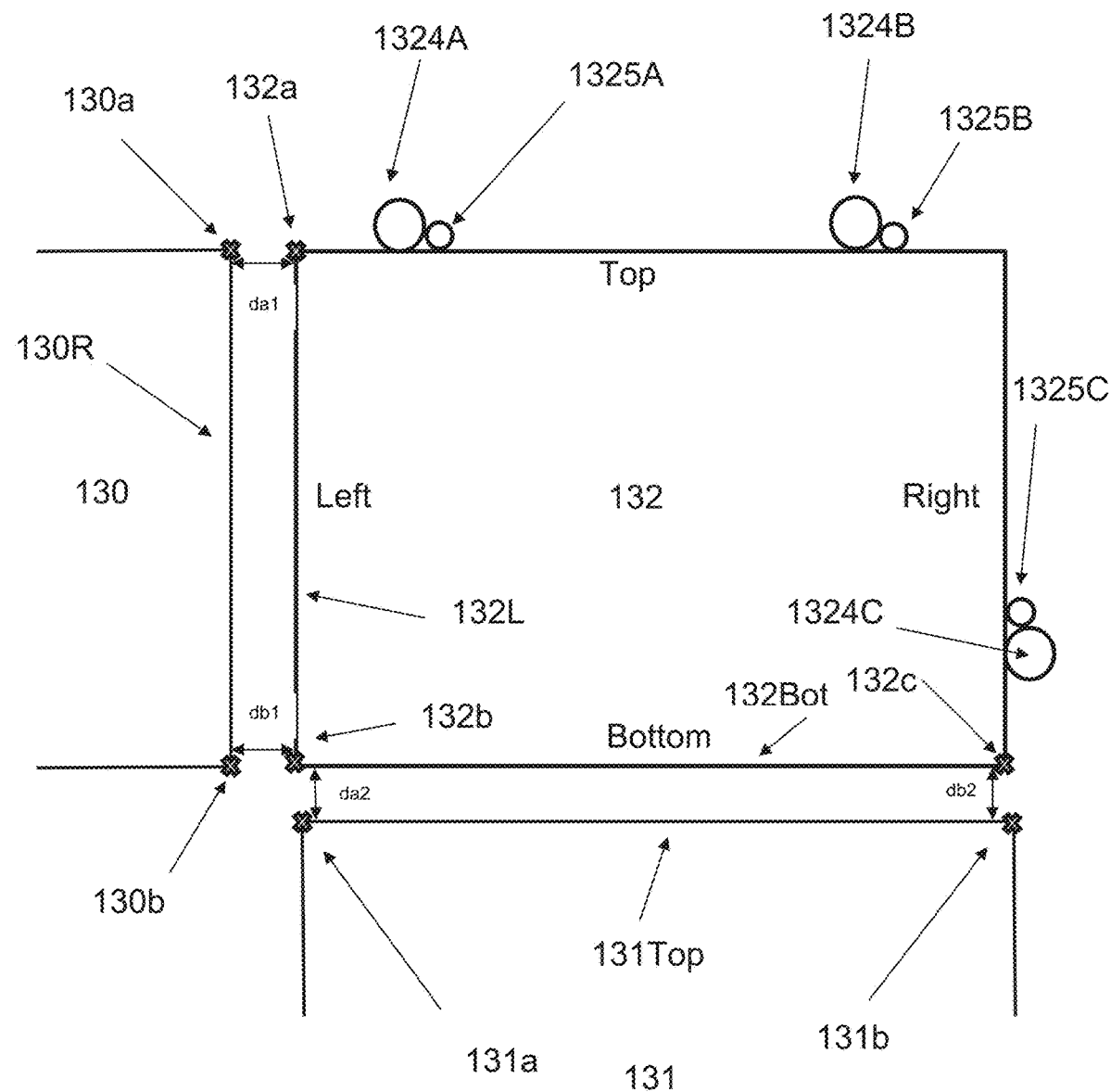
FIG. 13 shows examples of the parameters than can be used to evaluate the alignment of a display tile with two adjacent display tiles when used with the present invention.

As illustrated on FIG. 13, the alignment of a display tile 132 can be made by monitoring the relative positions of three of its corners (132a, 132b, 133c) with respect to the corners of display tile 130 (corners 130a and 130b on the right side of the display tile 130) and/or of display tile 131 (corners 131a and 131b on the top side of display tile 131).

Similarly, to what was described with the help of FIG. 12, the distances between corners of tile 130 and the corresponding corners of tile 132 can be evaluated as well as the distance between corners of tile 132 and the corresponding corners of tile 131:

The distance db1 between the bottom left corner 132b of display tile 132 and the bottom right corner 130b of display tile 130; and The distance da1 between the top left corner 132a of display tile 132 and the top right corner 130a of display tile 130.

The distance da2 between the top left corner 131a of display tile 131 and the bottom left corner 132b of display tile 132; and The distance db2 between the top right corner 131b of display tile 131 and the bottom right corner 132c of display tile 132.

If the right side 130R of display tile 130 is parallel to the left side 132L of display tile 132, then the distances da1 and db1 are equal.

If the top side 131Top of display tile 131 is parallel to the bottom side 132Bot of display tile 132, then the distances da2 and db2 are equal.

If these conditions are not met, the display tile 132 must be rotated.

Additionally, if the distances da1, da2, db1 and db2 are all equal but differ from their nominal value (the nominal value being the value when the seam is as expected), it is necessary to translate the display tile 132.

For embodiments of the invention wherein the display tile and the intermediary support structure are attached to one another by means of pins and holes, if one of the tiles is damaged, it can be extracted while leaving the intermediary support structure fastened to the support structure. The tile and the intermediary support element being manufactured with a higher precision than the support structure, a new tile can be attached to said intermediary support element without having to adjust the alignment of the tiles.

A tool can be used to manipulate a display tile without coming into contact with the display surface of the display tile, while aligning that display tile with one or more adjacent display tiles.

Trusses arching over the display surfaces can interact with the fastening means like disposed around one or two abutting sides of the display tile. Two and preferably three sensors (in particular, the sensors are image sensors) are fastened to the tool so as to have the corners of the display tile in their respective field of view. The corners to be monitored are the corners which will be closest to the display tiles already fastened to the support structure (for example 400) with which the display tile will be aligned. For instance, if the means for fastening to the support structure are along the top and right side of the display tile, the cameras have in their field of view the top left corner, the bottom left corner and the bottom right corner, respectively. In general, the corners that are used to evaluate the seam (or the distance between display tiles) are those corners that are part of the sides where there are no fastening means for fastening to the support structure and no fastening means for fastening to the tool.

The tool can be fastened to e.g. an XY+rotation motorized gantry mechanism. The motors of the gantry mechanism are controlled by controlling means (such as, for example, a microcontroller) that uses the reading of the sensors to determine how the motors must be driven to bring the readings to their desired value.

The distances da1, da2 can be derived in any way known to the art. In particular, when the sensors are cameras, ad-hoc image processing is used to determine the distances.

The distances can be derived from images taken by the image sensor by, for example, counting the number of pixels that separate specific points indicated on the surface of the display tiles in the vicinity of the corners on each display tile. For instance, one pixel at the apex of each corner can be flashed on and off to facilitate its identification (by subtracting two consecutive images and thresholding, only the flashing pixels will be left).

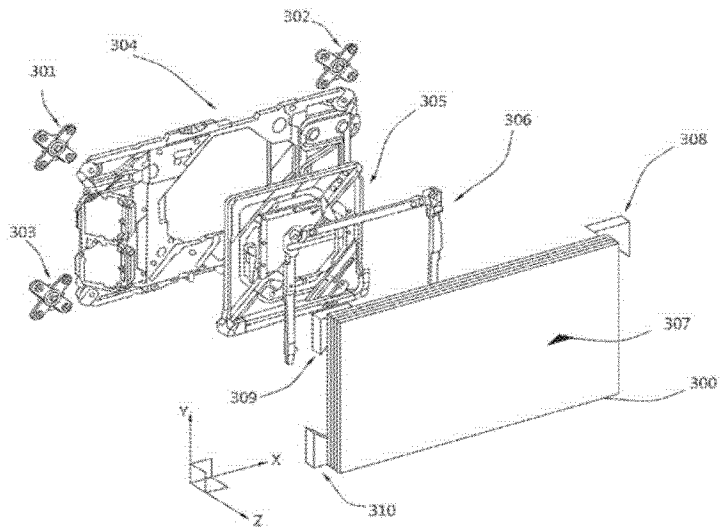

What is claimed is:

1. An intermediary support structure for supporting a single display tile comprising:
    fastening means for fastening the intermediary support structure to a back side of the single display tile, the single display tile having several edges and a perimeter or footprint, and
    at least one first fastener for fastening the intermediary support structure to a support structure for supporting multiple display tiles such as to form a tiled display, and
    wherein said first fastener, when the single display tile is fastened to the intermediate support member, is located outside of the perimeter or footprint of the single display tile and is distributed along one edge of the single display tile or along two adjacent edges of the single display tile;
    said first fastener extending beyond the perimeter or footprint of the single display tile by a distance D that is larger than a nominal seam between two adjacent display tiles of the tiled display, and
    said first fastener being configured to be accessed from the display side of the single display tile.

2. The intermediary support structure according to claim 1, wherein a seam between adjacent tiles is too small to allow access to said first fastener.

3. The intermediary support structure according to claim 1, wherein said intermediary support structure is configured to lie between the display tile and a support structure such as a frame or wall when in operation.

4. The intermediary support structure according to claim 1, wherein the support structure is a metallic plate.

5. The intermediary support structure according to claim 4, wherein the metallic plate has first openings optionally located at regular intervals.

6. The intermediary support structure according to claim 5, wherein the first openings are for receiving said first fastener which is loose or is fixed to the first openings to fasten display tiles to the support structure or to fasten an intermediary structure.

7. The intermediary support structure according to claim 1, wherein width of a seam which is the distance between adjacent display tiles does not allow to access said first fastener through the seam.

8. The intermediary support structure according to claim 1, wherein the intermediary support element has third means for fastening to a support structure.

9. The intermediary support structure according to claim 8, wherein the third fastening means include second openings.

10. The intermediary support structure according to claim 9, wherein the second openings are each located on one extremity of three extremities of a Y-shaped or T-shaped device.

11. The intermediary support structure according to claim 1, wherein the display tile has a first surface that is a front surface or display surface and a second surface that is a back surface.

12. A tiled display including an associated intermediary support structure according to claim 1, wherein a first tile is fastened to a support structure by means of its associated intermediary support structure having means of a plurality of fastening means.

13. The tiled display according to claim 12, wherein the plurality of fastening means used to fasten the display tile to the support structure are either on a single side or edge of the display tile or are distributed along two abutting sides or edges.

14. The tiled display according to claim 12, comprising means to manipulate a display tile without having to contact its display surface, the means including a tool fastened to the intermediary support structure by means of fastening means.

15. The tiled display according to claim 14, wherein the display tile is fastened to the tool and is translated and/or rotated by means of one or more motors and the relative position of the display tile with respect to one or two adjacent tiles is monitored by one or more sensors.

* * * * *

UNITED STATES PATENT AND TRADEMARK OFFICE
CERTIFICATE OF CORRECTION

| | | |
|---|---|---|
| PATENT NO. | : 11,359,382 B2 | Page 1 of 2 |
| APPLICATION NO. | : 16/924575 | |
| DATED | : June 14, 2022 | |
| INVENTOR(S) | : Karim Meersman et al. | |

It is certified that error appears in the above-identified patent and that said Letters Patent is hereby corrected as shown below:

On the Title Page

Please replace the Title Page with the attached Title Page

In the Claims

Column 20, Line 41, insert after Claim 15 the following claims:
--16. The intermediary support element according to claim 1, further comprising coupling means or fastening means adapted for coupling or fastening the intermediary support element to a display tile.

17. The intermediary support structure according to claim 16, wherein the coupling or fastening means comprises holes that are configured to mate with protrusions such as pins on the display tile.

18. The intermediary support structure according to claim 1, further comprising second coupling means configured for manipulating the display tile without risk of damaging the display surface of the display tile.

19. The intermediary support structure according to claim 18, wherein the second coupling means are each located on one extremity of the Y-shaped or T- shaped device, respectively.

20. The intermediary support structure according to claim 19, wherein the second coupling means include a third opening located adjacent a second opening, respectively.

21. The intermediary support structure according to claim 11, wherein the back surface has a fastener optionally fastening means to be fastened to the intermediary support element 22. The intermediary support structure according to claim 21, wherein once the pins and/or holes of the intermediary support elements and the corresponding holes and pins on the back surface are mated, the display tile and the intermediary support element behave like a solid body.--

Signed and Sealed this
Seventh Day of November, 2023

Katherine Kelly Vidal
*Director of the United States Patent and Trademark Office*

CERTIFICATE OF CORRECTION (continued)

(12) United States Patent
Meersman et al.

(10) Patent No.: US 11,359,382 B2
(45) Date of Patent: Jun. 14, 2022

(54) ALIGNMENT MECHANISM AND ALIGNMENT METHODS FOR TILED DISPLAYS

(71) Applicant: BARCO N.V., Kortrijk (BE)

(72) Inventors: Karim Meersman, Kortemark (BE); Tom Declerck, Meulebeke (BE); Bruno Devos, Zulte (BE); Greet Adams, Deerlijk (BE)

(73) Assignee: BARCO N.V., Kortrijk (BE)

( * ) Notice: Subject to any disclaimer, the term of this patent is extended or adjusted under 35 U.S.C. 154(b) by 0 days.

(21) Appl. No.: 16/924,575

(22) Filed: Jul. 9, 2020

(65) Prior Publication Data
US 2022/0010562 A1    Jan. 13, 2022

(51) Int. Cl.
| | |
|---|---|
| *E04B 1/61* | (2006.01) |
| *E04F 13/25* | (2006.01) |
| *E04F 13/08* | (2006.01) |
| *E04F 13/26* | (2006.01) |
| *E04F 21/00* | (2006.01) |

(52) U.S. Cl.
CPC ......... *E04F 13/25* (2013.01); *E04F 13/0801* (2013.01); *E04F 13/0871* (2013.01); *E04F 13/26* (2013.01); *E04F 21/00* (2013.01)

(58) Field of Classification Search
None
See application file for complete search history.

(56) References Cited

U.S. PATENT DOCUMENTS

| | | | | |
|---|---|---|---|---|
| 5,323,552 | A * | 6/1994 | Fritz | G09F 1/10 40/605 |
| 5,761,839 | A * | 6/1998 | Heikkila | G09F 7/08 40/730 |
| 6,054,968 | A * | 4/2000 | De Matteo | G09F 15/0068 312/7.2 |
| 10,056,014 | B2 * | 8/2018 | Meersman | G09F 9/3026 |
| 10,064,504 | B2 * | 9/2018 | Hogrefe | F16M 13/02 |
| 2003/0056413 | A1 * | 3/2003 | Wiemer | G09F 9/3026 40/730 |
| 2009/0310065 | A1 * | 12/2009 | Dunn | H01L 25/0753 349/69 |
| 2018/0359426 | A1 | 12/2018 | Adema et al. | |

FOREIGN PATENT DOCUMENTS

| | | |
|---|---|---|
| CN | 108922421 A | 11/2018 |
| KR | 20070085011 A | 8/2007 |
| WO | 2019034786 A1 | 2/2019 |
| WO | 2020074064 A1 | 4/2020 |

OTHER PUBLICATIONS

International Search Report and Written Opinion issued in PCT/EP2021/069236, dated Nov. 29, 2021.

* cited by examiner

*Primary Examiner* — Basil S Katcheves
(74) *Attorney, Agent, or Firm* — Hamre, Schumann, Mueller & Larson, P.C.

(57) ABSTRACT

An intermediary support structure including fasteners for fastening to a back side of a display tile and further includes a fastener or a fastening device for fastening the intermediary support structure to a support structure supporting multiple display tiles.

22 Claims, 20 Drawing Sheets